United States Patent
Maemura et al.

(10) Patent No.: US 7,190,282 B2
(45) Date of Patent: Mar. 13, 2007

(54) NOSE-VIEW MONITORING APPARATUS

(75) Inventors: Takahiro Maemura, Aichi (JP);
Masahiro Ikeyama, Aichi (JP);
Emrullah Durucan, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 113 days.

(21) Appl. No.: 11/087,873

(22) Filed: Mar. 24, 2005

(65) Prior Publication Data

US 2005/0225636 A1    Oct. 13, 2005

(30) Foreign Application Priority Data

Mar. 26, 2004  (JP) .............................. 2004-091666
Mar. 26, 2004  (JP) .............................. 2004-091667

(51) Int. Cl.
*G08G 1/16*    (2006.01)
(52) U.S. Cl. ................. 340/903; 340/988; 340/436; 340/435; 348/148; 701/213; 701/301
(58) Field of Classification Search .............. 340/903, 340/988, 435, 436, 933, 990, 995, 901, 937; 348/148, 104, 113, 119, 118; 701/213, 301; 382/103, 104, 106
See application file for complete search history.

(56) References Cited

U.S. PATENT DOCUMENTS

| | | | | |
|---|---|---|---|---|
| 5,521,633 A | * | 5/1996 | Nakajima et al. ........... | 348/118 |
| 6,218,960 B1 | * | 4/2001 | Ishikawa et al. ............ | 340/901 |
| 6,756,887 B2 | * | 6/2004 | Evans .......................... | 340/436 |
| 6,812,831 B2 | * | 11/2004 | Ikeda ........................... | 340/435 |
| 6,888,447 B2 | * | 5/2005 | Hori et al. ................... | 340/435 |

FOREIGN PATENT DOCUMENTS

| | | |
|---|---|---|
| DE | 4332612 C2 | 4/1994 |
| DE | 10102884 A1 | 8/2001 |
| DE | 10108646 A1 | 8/2001 |
| JP | 9-58343 A | 3/1997 |
| JP | 2000-71894 A | 3/2000 |
| JP | 2000-168442 A | 6/2000 |
| JP | 2000-251199 A | 9/2000 |
| JP | 3239521 B2 | 10/2001 |

(Continued)

*Primary Examiner*—Anh V. La
(74) *Attorney, Agent, or Firm*—Birch, Stewart, Kolasch & Birch, LLP

(57) ABSTRACT

The present invention relates to a nose-view monitoring apparatus, and it is an object of the invention to detect an approaching object existing in lateral regions relative to a nose portion of a vehicle with high accuracy for notifying the information on the approaching object to an occupant. The nose-view monitoring apparatus comprises an image pickup unit provided on a nose of the vehicle for picking up a side-view image with respect to the vehicle, an optical flow vector calculating unit for calculating an optical flow vector on the basis of the image, an approaching object detecting unit for detecting the approaching object on the basis of, of the optical flow vectors calculated by the optical flow vector calculating unit, an optical flow vector having a vector component along a traveling direction of the vehicle in the image, and a notification unit for displaying the image and further for notifying the fact of the detection of the approaching object.

14 Claims, 9 Drawing Sheets

FOREIGN PATENT DOCUMENTS

| | | |
|---|---|---|
| JP | 3287817 B2 | 3/2002 |
| JP | 2003-40036 A | 2/2003 |
| JP | 3398934 B2 | 2/2003 |
| JP | 2003-118484 A | 4/2003 |
| JP | 2003-179915 A | 6/2003 |
| JP | 2003-306105 A | 10/2003 |

* cited by examiner

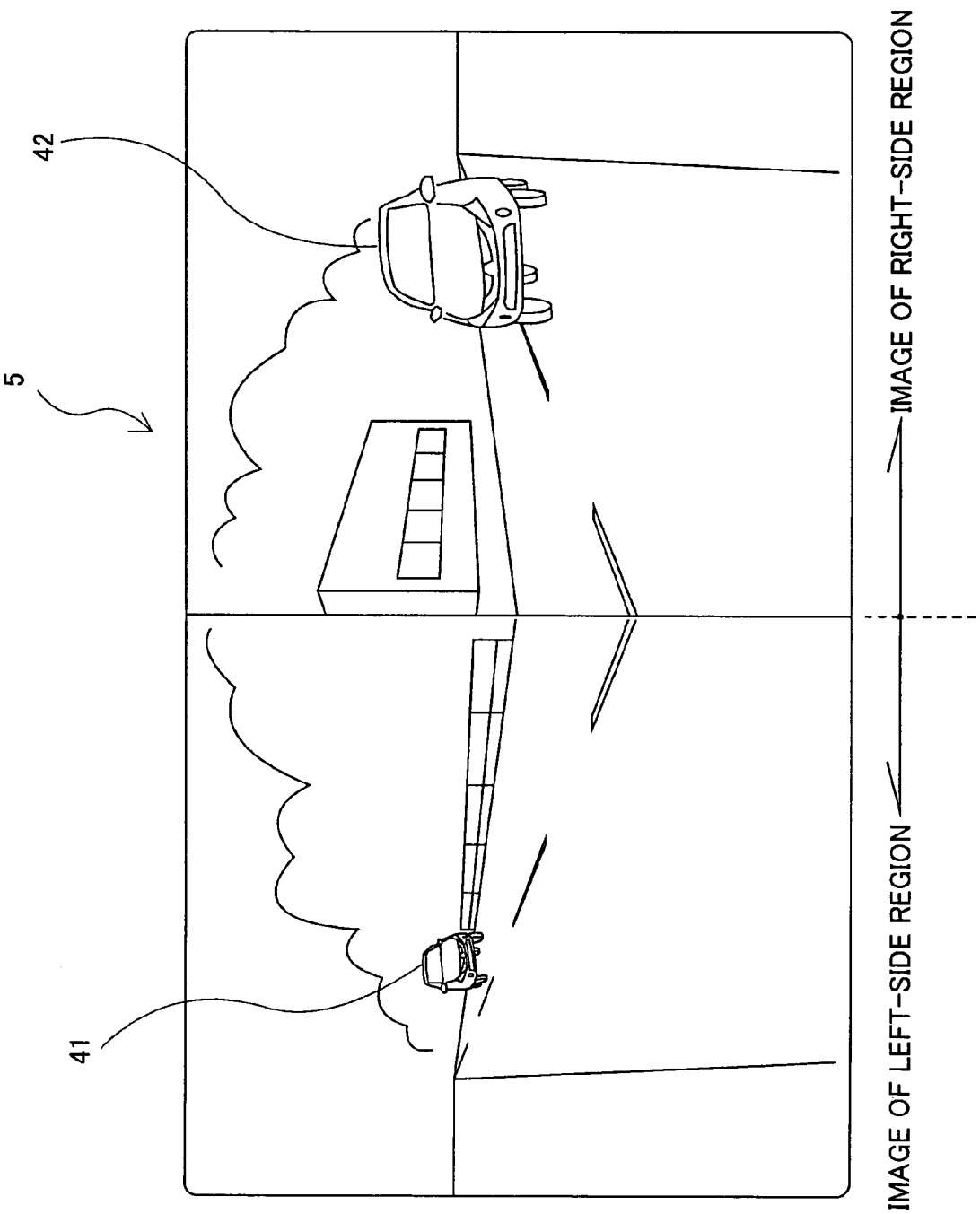

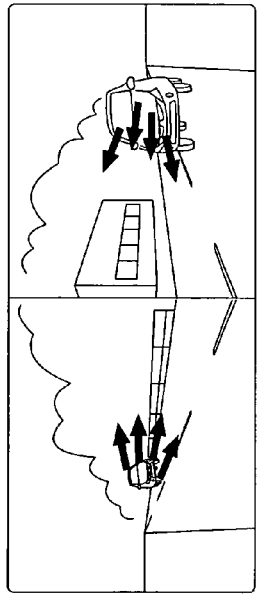

FIG. 3A

FLOW VECTOR DEVELOPING WHEN
VEHICLE IS IN STOPPING STATE

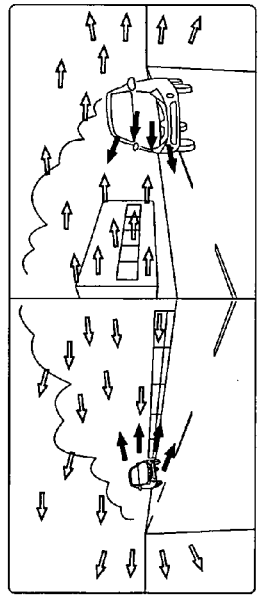

FIG. 3B

FLOW VECTOR DEVELOPING WHEN
VEHICLE IS IN ADVANCING STATE

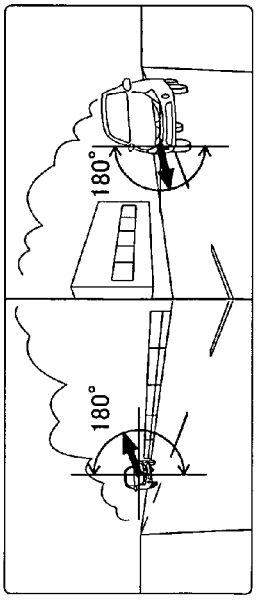

FIG. 3C

GRADIENT RANGE OF FLOW VECTOR FOR
EXTRACTION OF ONLY APPROACHING OBJECT

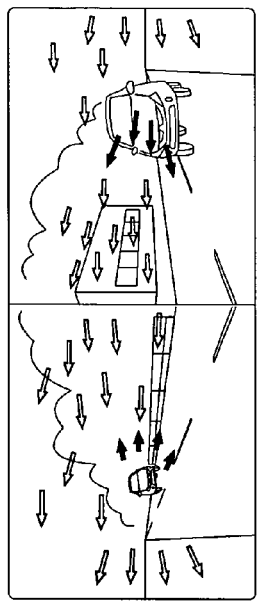

FIG. 3D

FLOW VECTOR DEVELOPING WHEN VEHICLE
IS IN RIGHTWARD TURNING STATE

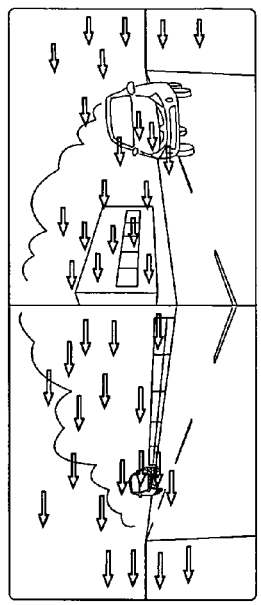

FIG. 3E

TURNING FLOW VECTOR WHEN VEHICLE
IS IN RIGHTWARD TURNING STATE

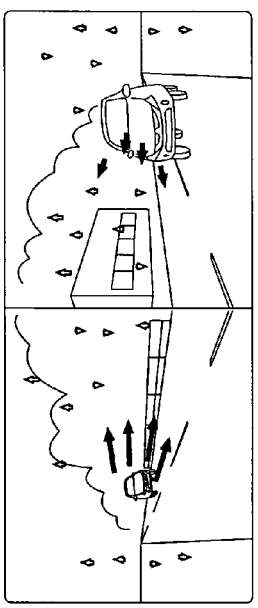

FIG. 3F

CORRECTED FLOW VECTOR WHEN VEHICLE
IS IN RIGHTWARD TURNING STATE

NOSE-VIEW MONITORING APPARATUS

BACKGROUND OF THE INVENTION (1) Field of the Invention

The present invention relates to a nose-view monitoring apparatus designed to display a pickup image taken through a nose-view camera(s) and further to extract optical flow vectors from the pickup image.

(2) Description of Related Art

So far, there has been developed a technique in which an image pickup camera is located at a nose (front end) portion of a vehicle so as to pick up a side-view image (right- and/or left-side image of lateral regions) and each of the pickup image (so-called nose-view image) is displayed on a monitoring apparatus or the like for supplementing the occupant's unaided vision. In general, in such a technique, a monitoring apparatus, which is designed to display a pickup image, is also used as an in-vehicle monitor made to display a television image, a car navigation image (screen display with car navigation system) or the like, and a television image or a navigation image is displayed thereon when a vehicle is running while the display switching to a nose-view image automatically takes place when the vehicle approaches an intersection or a T junction and comes to a temporary stop.

In addition, Japanese Patent No. 3287817 discloses a vehicle camera apparatus attached to a front portion of a vehicle to take a side-view image to be displayed on a monitoring apparatus (display unit) in the interior of the vehicle wherein the apparatus is automatically switched on in accordance with a speed or deceleration of the vehicle before the stop of the vehicle or before the vehicle reaches a predetermined low-speed run. This arrangement enables the apparatus to be switched on to put a lateral pickup image from a nose portion on a display before a temporary stop of the vehicle, for example, when the vehicle approaches an intersection and the driver confirms the lateral safe conditions, which allows the driver to carry out the speedy and smooth lateral safe confirmations well in advance. On the other hand, the apparatus remains switched off in a case in which the vehicle is in a slow-driving condition due to traffic congestion, which can prevent the interference with a television image, a navigation image or the like.

Moreover, with respect to a pickup image to be taken through such a monitoring apparatus, there has been developed a technique which is for detecting a mobile object existing in the pickup image by using an optical flow. In this case, the optical flow signifies a two-dimensional velocity vector field on an image, i.e., an apparent velocity field of a moving body in a moving image. In such a technique, for example, a point recognizable as the same object is set (detected through arithmetic operations) as a feature point between two consecutive images picked up on a predetermined period so that a movement (moving direction and moving distance) of this feature point is calculated as a vector (this vector is an optical flow vector and is equally referred to simply as a flow vector and, sometimes, it is referred to as an optical flow). Moreover, when the feature point and the flow vector are calculated throughout the entire region within the pickup image, the information such as position of a mobile object and moving direction in the image are recognizable.

Furthermore, Japanese Patent No. 3398934 discloses a technique of conducting arithmetic operations for calculating an optical flow of a pickup image in a vehicle driving direction (forward direction which is a traveling direction of the vehicle) except a region corresponding to a scene outside a road in the image. Concretely, the calculation of the optical flow is made with respect to only a region including a lower portion surrounded by straight lines drawn from an infinite-point on an image to both lower corner portions of a screen and a peripheral portion of the infinite-point. This can reduce the arithmetic throughput and shorten the processing time for an increase in speed, in comparison with a case of the calculation of an optical flow throughout the entire region of the image.

Meanwhile, for recognizing an mobile object such as a vehicle approaching the own vehicle on the basis of a nose-view image taken in a lateral field of view with respect to the vehicle by using an optical flow, if the vehicle is in a stopping state, no flow vector appears on an object (for example, the background portion in an image, such as buildings, street trees) which does not vary the relative position with respect to the vehicle, while a flow vector is generated and develops on only a body which moves actually. This signifies that the mobile object exists in the flow vector developing place, thus enabling the accurate detection of the mobile object on the basis of the presence or absence of the flow vector.

However, in general, a situation requiring a nose-view image is a case of the entry into blind intersections or T junctions and, in this situation, in most cases the vehicle driver slowly advances the vehicle while seeing the nose-view image for the lateral safe confirmation. Thus, in a state where the vehicle is in movement, the angle (composition) itself of the nose-view image moves, thereby creating a problem in that a flow vector develops even on an object such as a building or street tree which constitutes the background in the image and which does not move actually and, hence, the background is detected as a mobile object. Moreover, difficulty is experienced in extracting/detecting only a mobile object approaching the own vehicle from an image taken in a situation that the angle itself varies.

In addition, in a case of carrying forward a vehicle in a state where a steering wheel is turned, the entire nose-view image moves in accordance with a turning radius or turning speed of the vehicle. That is, there exists a problem in that a flow vector develops on the entire image due to the movement of the image pickup camera itself, which causes an optical flow developing due to the movement of the own vehicle and an optical flow generated by an actual mobile object to be detected in a state mixed so that difficulty is encountered in extracting (detecting) these optical flows separately.

For solving this problem, for example, Japanese Patent 3239521 discloses a technique of calculating an apparent optical flow generated by a motion of the own vehicle in a mobile object recognition apparatus designed to calculate an optical flow on the basis of a front-view image relative to a vehicle. In this technique, the apparent optical flow is calculated on the basis of data on a moving direction of the own vehicle and a distance to an object related to the extraction of the optical flow. And in the technique, a mobile object is detected by compensating for the influence of the motion of the vehicle on the optical flow.

However, this technique requires not only the moving direction data such as vehicle traveling speed and yaw rate but also the distance to an object to be detected, for calculating the apparent optical flow, i.e., the optical flow developing due to the movement of the own vehicle, which leads to complicated arrangement and complicated arithmetic operations.

Moreover, for example, with respect to a pickup image taken through a camera made to pick up images in front or rear field of view, since an apparent speed of an object to be detected as a mobile object is calculated as a difference (relative speed) between a traveling speed of the own vehicle and a traveling speed of the object, the image pickup is made at a moving speed lower than the actual moving speed of the object and, in most case, the magnitude of the optical flow of the object, extracted from the pickup image, becomes relatively small.

On the other hand, in the case of a nose-view camera designed to take images in lateral field of view with respect to a vehicle, an object of image pickup is usually a traveling ordinary vehicle or the like in a state where the own vehicle is in a stopping or slow-moving condition. For this reason, the image pickup is made at a traveling speed almost equal to the actual traveling speed of the object (that is, since the traveling speed of the own vehicle is low, the apparent traveling speed of the object on the pickup image does not become considerably low), which frequently causes the extraction of a relatively large optical flow so that the arithmetic throughput increases in the arithmetic operation for the optical flow. Accordingly, the precise optical-flow based recognition of a mobile object such as a vehicle approaching the own vehicle in a nose-view image requires the employment of an arithmetic processing unit with a high processing ability (throughput), which leads to an increase in apparatus cost as a whole. Thus, for detecting a mobile object from a pickup image taken through a nose-view camera on the basis of an optical flow, one solution to a conventional problem involves the reduction of the arithmetic operations.

SUMMARY OF THE INVENTION

The present invention has been developed with a view to eliminating this problem, and it is therefore an object of the invention to provide a nose-view monitoring apparatus capable of detecting an approaching object existing at a lateral position relative to a nose portion of a vehicle with a high degree of accuracy by using a simple logic for notifying information on the approaching object to occupants.

For this purpose, in accordance with an aspect of the present invention, there is provided a nose-view monitoring apparatus comprising image pickup means provided on a nose of a vehicle for picking up a side-view image with respect to the vehicle, optical flow vector calculating means for calculating an optical flow vector on the basis of the image, approaching object detecting means for detecting an approaching object on the basis of an optical flow vector having a vector component along (or on the side of) a traveling direction of the vehicle in the image which vector is included in the optical flow vectors calculated by the optical flow vector calculating means, and notification means for displaying the image and further for notifying the fact of the detection of the approaching object.

This arrangement enables easy recognition of an object approaching own vehicle from a lateral direction and further allows the reduction of arithmetic throughput for the optical flow. Moreover, this can prevent the movement of a background image of a pickup image from being mistaken for an approaching object toward the own vehicle even if the own vehicle is moving at a low speed, and further enables a precise detection of a mobile object, thus achieving the improvement of the detection accuracy. Therefore, the miscommunication on the approaching object toward the own vehicle becomes reducible.

Preferably, the image pickup means is made to pick up each of side-view images of right-side region and left-side region with respect to the vehicle, the optical flow vector calculating means is made to calculate an optical flow vector on the basis of each of the images of the lateral regions with respect to the vehicle, picked up by the image pickup means, and the approaching object detecting means is made to detect an approaching object on the basis of an optical flow vector having a rightward vector component which vector is included in the optical flow vector in the left-side region calculated by the optical flow vector calculating means, and on the basis of an optical flow vector having a leftward vector component which vector is included in the optical flow vector in the right-side region calculated by the optical flow vector calculating means.

This arrangement enables easy detection of the approaching object toward the own vehicle in the right-side region and left-side region, and further allows the approaching object toward the own vehicle to be detected with high accuracy by using a simple control logic.

In addition, preferably, the nose-view monitoring apparatus further comprises vehicle speed detecting means for detecting a speed of the vehicle, and the approaching object detecting means suspends the detection of the approaching object when the vehicle speed exceeds a predetermined value set in advance.

This arrangement can reduce the mistaken recognition and mistaken notification on an approaching object due to the movement at a high own vehicle speed. In consequence, the accuracy of detection of the approaching object based upon an optical flow becomes improvable.

Still additionally, preferably, the nose-view monitoring apparatus further comprises steering angle detecting means for detecting a steering angle of the vehicle, and the approaching object detecting means suspends the detection of the approaching object when the steering angle exceeds a predetermined value set in advance.

This arrangement can reduce the mistaken recognition and mistaken notification on an approaching object due to the movement at a large steering angle. In consequence, the accuracy of detection of the approaching object based upon an optical flow becomes improvable.

Yet additionally, preferably, the notification means notifies the fact of the suspension (stopping) of the detection of the approaching object in the approaching object detecting means.

The notification on the suspension of the detection of an approaching object for the prevention of the mistaken recognition can be made to an occupant(s) so as to make the occupant pay attention to the approaching object, thereby further enhancing the safety.

Preferably, the nose-view monitoring apparatus of the present invention further includes turning direction detecting means for detecting a turning direction of the vehicle, turning state corresponding value detecting means for detecting a parameter corresponding to a turning state of the vehicle, and turning optical flow vector setting means for setting a turning optical flow vector generated by a turn of the vehicle in a side-view image with respect to the vehicle, on the basis of said turning direction and said parameter, wherein the optical flow vector calculating means including optical flow vector correcting means for subtracting the turning optical flow vector, set in the turning optical flow vector setting mean, from an optical flow vector calculated on the basis of the image to carry out correction, and wherein the approaching object detecting means being made to detect an approaching object on the basis of an optical flow vector having a vector component along a traveling direction of said vehicle in said image which vector is included in the optical flow vectors corrected by said optical flow vector correcting means in said optical flow vector calculating means.

According to the present invention, a turning optical flow vector generated by a turn of the vehicle is calculated approproately on the basis of a turning direction and a turning state. Therefore, correcting calculation of optical flow vectors due to a turn of the vehicle can be simplified.

And the mistaken recognition on an approaching object due to the turning movement is avoidable. This can enhance the accuracy of detection of an approaching object based on the optical flow.

Preferably, the turning optical flow vector setting means sets a direction of a turning optical flow vector at a horizontal direction and an outward direction relative to the turning direction detected by the turning direction detecting means, and sets the magnitude of the turning optical flow vector to correspond to a value of the parameter detected by the turning state corresponding value detecting means.

This arrangement enables easy calculation of a turning optical flow vector. Moreover, calculation for detecting of an approaching object can be reduced and simplified.

Preferably, the turning state corresponding value detecting means detects an angular velocity at a turn of the vehicle as said parameter corresponding to the turning state of the vehicle.

Moreover, the turning state corresponding value detecting means detects a traveling speed of the vehicle and a steering angle thereof as the parameter corresponding to the turning state of the vehicle.

According to the present invention, a turning state of the vehicle can be detected easily by using parameters measured easily like an angular velocity, a traveling speed, a steering angle of the vehicle and so on.

Additionally, the nose-view monitoring apparatus further comprises turning direction detecting means for detecting a turning direction of the vehicle, wherein the approaching object detecting means detects an approaching object on the basis of an optical flow vector existing in a lateral region along a turning outward direction of the vehicle detected by the turning direction detecting means and having a vector component along a traveling direction of the vehicle in the image which vector is included in the optical flow vectors calculated by the optical flow vector calculating means at a turn of said vehicle, and said approaching object detecting means does not make reference to an optical flow vector existing in a lateral region along a turning inward direction of the vehicle detected by the turning direction detecting means for the detection of the approaching object.

According to the present invention, correction of an optical flow vector at a turning of the vehicle can be simplified by calculation on the basis of an optical flow vector existing in a lateral region along a turning outward direction in which an approaching object is detected clearly. Moreover, the mistaken recognition can be reduced and the accuracy of detection on an approaching object can be improved since no reference is made to the flow vectors in a lateral region along a turning outward direction in which an approaching object is not detected clearly.

Preferably, the notification (or alarm) means makes the switching among a plurality of notification modes in accordance with the magnitude of an optical flow vector having a vector component along a traveling direction of the vehicle and notifies the fact of the detection of the approaching object while displaying the image, or the notification means makes the switching among a plurality of notification modes in accordance with the number of optical flow vectors having a vector component along a traveling direction of the vehicle and notifies the fact of the detection of the approaching object while displaying the image.

With this arrangement, the switching among a plurality of notification modes according to the magnitude of the optical flow vector or the number of optical flows enables a decision on a degree of risk situation related to the approaching object to the own vehicle, which achieves an effective notification in accordance with the degree of risk situation, thereby enhancing the safety.

BRIEF DESCRIPTION OF THE DRAWINGS

FIG. 2 is an illustrative view showing the contents on a display screen as an example of monitor display in the nose-view monitoring apparatus according to an embodiment of the present invention;

FIG. 3A is an illustration useful for explaining the arithmetic operations in an approaching object detecting means of the nose-view monitoring apparatus according to an embodiment of the present invention, and is an illustrative view showing flow vectors developing when a vehicle is in a stopping condition;

FIG. 3B is an illustration useful for explaining the arithmetic operations in an approaching object detecting means of the nose-view monitoring apparatus according to an embodiment of the present invention, and is an illustrative view showing flow vectors developing when a vehicle makes a forward move;

FIG. 3C is an illustration useful for explaining the arithmetic operations in an approaching object detecting means of the nose-view monitoring apparatus according to an embodiment of the present invention, and is an illustrative view showing a directional range of flow vectors for the extraction of only an approaching object;

FIG. 3D is an illustration useful for explaining the arithmetic operations in an approaching object detecting means of the nose-view monitoring apparatus according to an embodiment of the present invention, and is an illustrative view showing flow vectors developing when a vehicle makes a rightward turn;

FIG. 3E is an illustration useful for explaining the arithmetic operations in an approaching object detecting means of the nose-view monitoring apparatus according to an embodiment of the present invention, and is an illustrative view showing turning flow vectors to be set when a vehicle makes a rightward turn;

FIG. 3F is an illustration useful for explaining the arithmetic operations in an approaching object detecting means of the nose-view monitoring apparatus according to an embodiment of the present invention, and is an illustrative view showing correction flow vectors to be calculated when a vehicle makes a rightward turn;

DESCRIPTION OF THE PREFERRED EMBODIMENTS

[First Embodiment]

First of all, a description will be given hereinbelow of a nose-view monitoring apparatus according to a first embodiment of the present invention.

Figure 1:
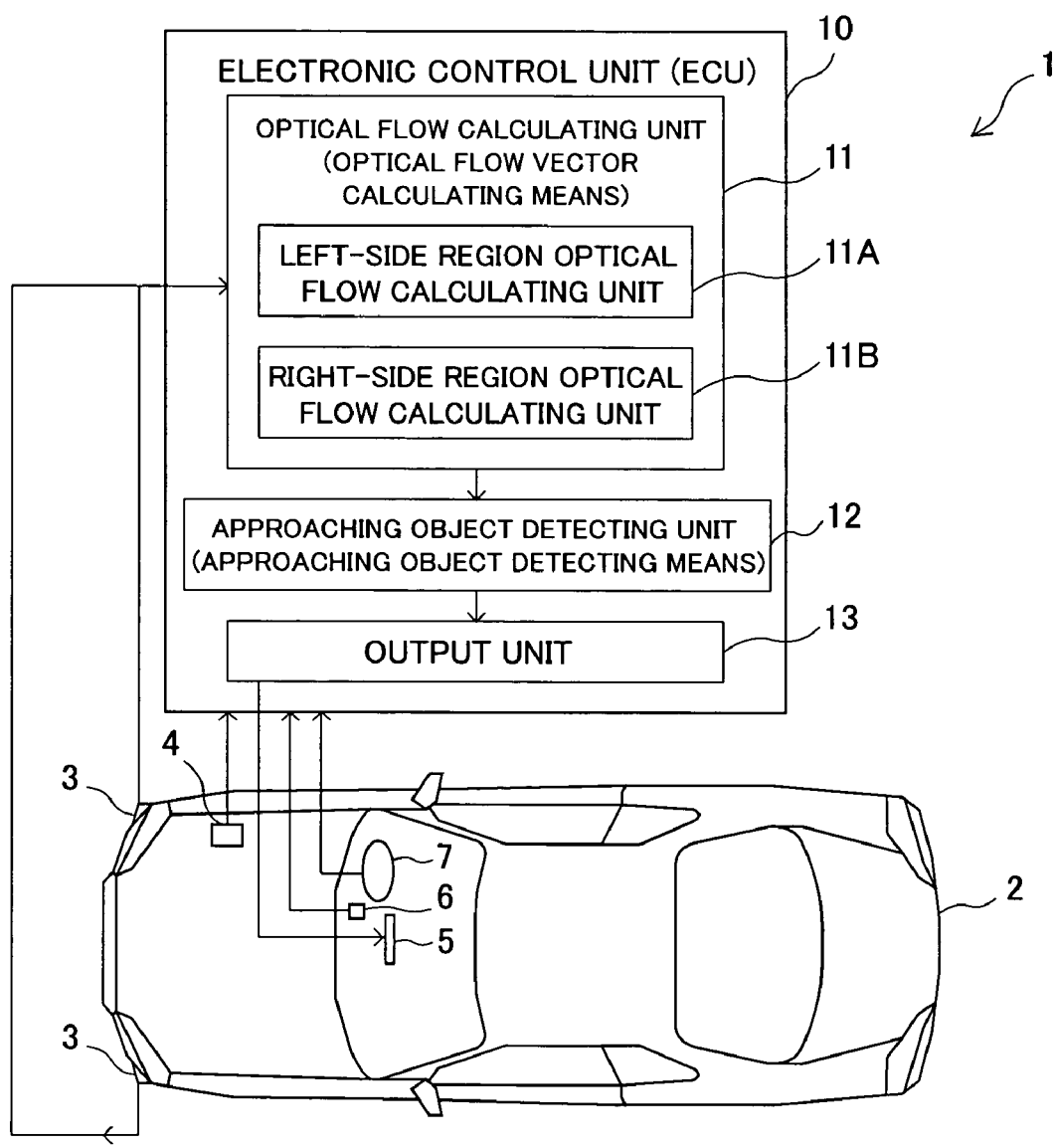
FIG. 1 is an illustrative view showing a configuration of a vehicle equipped with a nose-view monitoring apparatus according to a first embodiment of the present invention.
Figure 4:
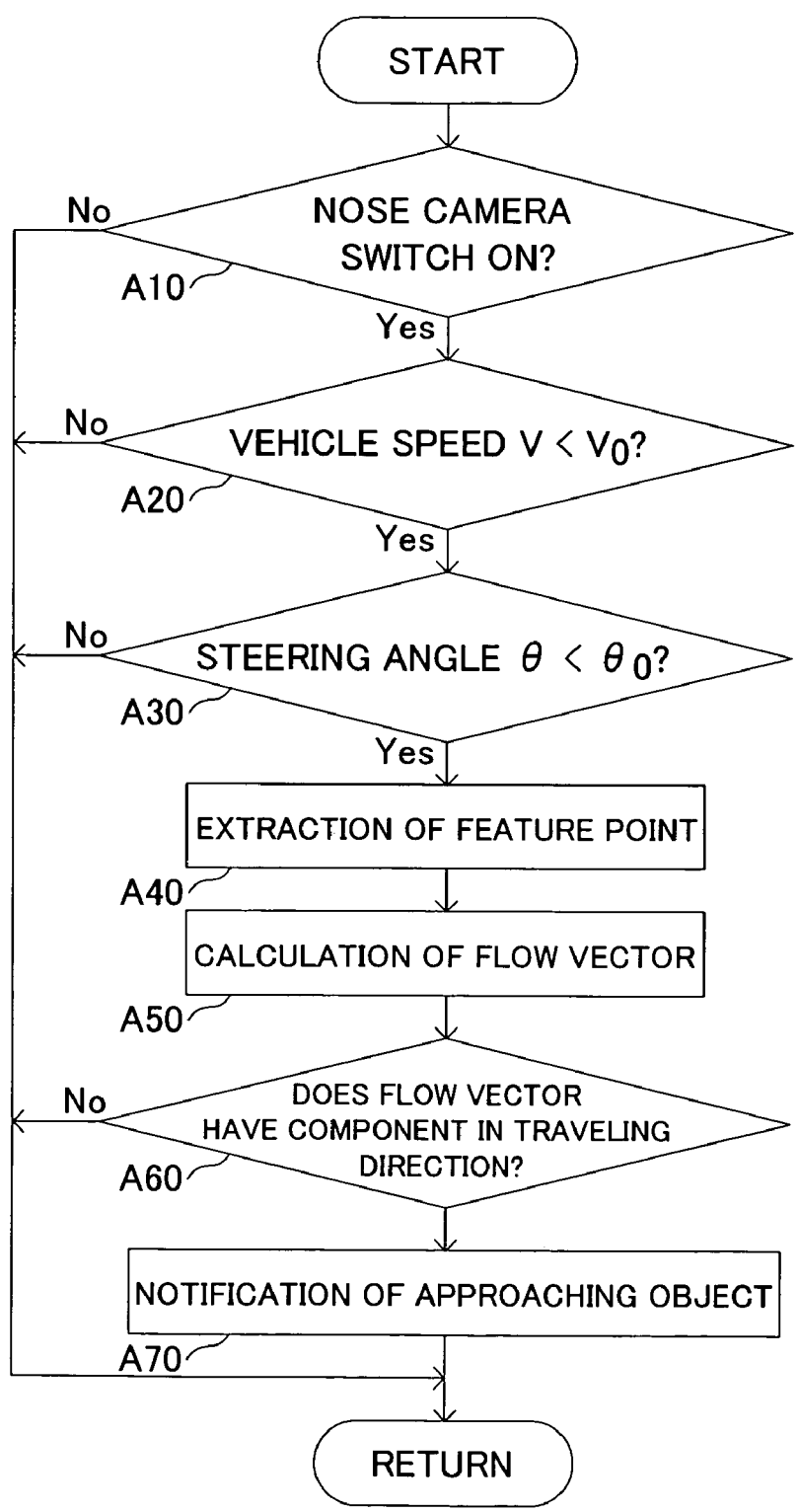
FIG. 4 is a flow chart useful for explaining control in the nose-view monitoring apparatus according to the first embodiment of the present invention.

FIG. 1 shows a vehicle 2 equipped with a nose-view monitoring apparatus 1 according to the present invention. The vehicle 2 is provided with nose-view cameras (image pickup means) 3 each for picking up an image (side-view image) of each of right- and left-side lateral regions relative to the vehicle 2, a vehicle speed sensor (vehicle speed detecting means) 4 for detecting a signal indicative of a traveling speed of the vehicle 2, a nose camera switch 6 serving as a switch for an operation of each of the nose-view cameras 3, a steering angle sensor (steering angle detecting means) 7 for detecting a signal indicative of a steering angle of a steering wheel (or rudder angle of a steered wheel) manipulated by an occupant, an electronic control unit (ECU) 10 and a monitor (notification means) 5 for displaying an image taken through each of the nose-view cameras 3.

The nose-view cameras 3 are provided at right- and left-side end portions of a nose (front end) section of the vehicle 2 in a state paired and are capable of simultaneously picking up images (side-view images) of right- and left-side regions (lateral field of view) with respect to the vehicle 2.

The monitor 5 is made to display the right- and left-side images picked up through the nose-view cameras 3. In this embodiment, as shown in FIG. 2, a right-side image relative to the vehicle 2 is displayed on a right half area of a monitor screen and, at the same time, a left-side image relative thereto is displayed on a left half area of the monitor screen. Accordingly, an occupant can simultaneously confirm the right- and left-side images relative to the vehicle 2.

Figure 5:
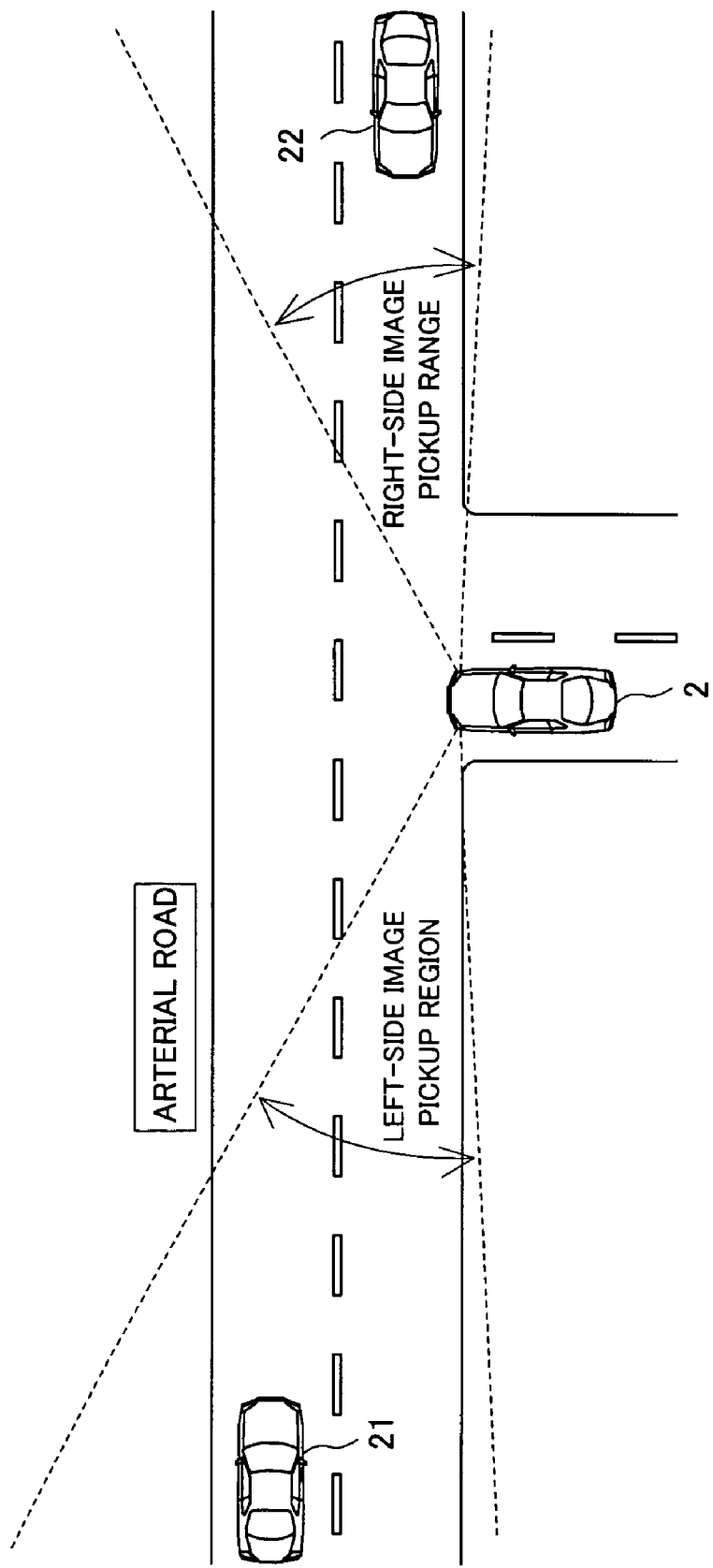
FIG. 5 is an illustrative plan view showing an image pickup region of a nose-view camera of the nose-view monitoring apparatus according to an embodiment of the present invention.

In this embodiment, as shown in FIG. 5, the regions taken through the right- and left-hand nose-view cameras 3 are right- and left-side regions in vehicle-width directions of the vehicle 2, and the nose-view cameras 3 are directed at slightly anterior positions with respect to directions perpendicular to the traveling direction of the vehicle 2. Therefore, in a left-side image relative to the vehicle 2, the traveling direction of the vehicle 2 becomes a right-hand direction in the image while, in a right-side image, the traveling direction thereof becomes a left-hand direction in the image. Moreover, as shown in FIG. 2, in the left-side image, a vehicle 41 approaching the vehicle 2 on a road in front of the vehicle 2 is displayed so as to enlarge while moving rightwards in the image while in the right-side image, the vehicle 42 approaching the vehicle 2 on the road in front of the vehicle 2 is displayed so as to enlarge while moving leftwards thereon.

The vehicle speed sensor 4 is made to detect information on a speed of rotation of a wheel and further to put it to the ECU 10. Likewise, the steering angle sensor 7 detects information on a steering angle of the steering wheel manipulated by the occupant and further to put it to the ECU 10. The ECU 10 is designed to calculate a traveling speed V of the vehicle 2 as a function of the inputted rotation speed information on the wheel and further to calculate a steering angle $\theta$ of the steered wheel on the basis of the steering angle information.

The nose camera switch 6 is for making the switching between the on/off of the operations of the nose-view cameras 3 and, when the nose camera switch 6 is placed into the off-state, the nose-view cameras 3 are put into a non-operated condition. Moreover, in a state where the nose camera switch 6 is placed into the on-state, the nose-view cameras 3 are put into operation when a predetermined condition (nose-view camera operation condition) holds.

The nose-view camera operation condition signifies that, for example, the traveling speed V of the vehicle 2 calculated in the ECU 10 is lower than a predetermined speed $V_0$ (speed corresponding to a considerably-low-speed state, for example, 5 km/h) set in advance and the rudder angle $\theta$ of the steered wheel is smaller than a predetermined angle $\theta_0$ set in advance (that is, the steering state of the steering wheel is close to a neutral state).

In this connection, although the monitor 5 displays the pickup image when the nose-view cameras 3 are in operation, it functions as a common in-vehicle motor to display a different image such as a television image or a car navigation image when the nose-view cameras 3 are not in operation.

More specifically, in a case in which, during a normal drive, the nose camera switch 6 is in the on-condition in a state where television images or car navigation images are displayed continuously, when the vehicle 2 enters an intersection or T junction, the nose-view cameras 3 are automatically placed into operation at the time that the vehicle speed falls below the predetermined speed $V_0$ in a state where the rudder angle $\theta$ is smaller than the predetermined angle $\theta_0$ so that the right- and left-side images are displayed on the monitor 5. In other words, the switching from a television image or car navigation image to the right- and left-side images automatically takes place without the occupant's intention. Moreover, when the rudder angle $\theta$ is equal to or larger than the predetermined angle $\theta_0$ or if the traveling speed V is equal to or higher than the predetermined speed $V_0$, then the nose-view cameras 3 are not placed into operation and the monitor 5 acts continuously as a common in-vehicle monitor to display a television image or car navigation image.

The values of the predetermined speed $V_0$ and the predetermined angle $\theta_0$ are set in view of the magnitudes of flow vectors in a background portion of a pickup image taken by the nose-view cameras 3, which will be mentioned later.

Moreover, in a case in which the nose camera switch 6 is placed into the off-state, it is possible to inhibit the operation of the nose-view cameras 3 even if the aforesaid nose-view camera operation condition reaches satisfaction.

The ECU 10 calculates an optical flow in each of right- and left-side pickup images taken by the nose-view cameras 3 for detecting a mobile (moving) object approaching the own vehicle 2. The ECU 10 is made up of an optical flow calculating unit (optical flow vector calculating means) 11 for calculating an optical flow of a pickup image, an approaching object detecting unit (approaching object detecting means) 12 for detecting an object approaching the own vehicle on the basis of the optical flow vector calculated in the optical flow calculating unit 11, and an output unit 13 for outputting these calculation and detection results. In the following description, each of optical flow vectors will be referred to as simply as a "flow vector", and an aggregate of these flow vectors will be referred to as a "optical flow".

The optical flow calculating unit 11 is made to individually calculate the optical flows of the right- and left-side images taken by the nose-view cameras 3, and a left-side region optical flow calculating unit 11A calculates the optical flow of the left-side image (that is, an image in the left half area in FIG. 2) while a right-side region optical flow calculating unit 11B calculates the optical flow of the right-side image (that is, an image in the right half area in FIG. 2). For the calculation of the optical flows, there is employed a method in which points corresponding to the same object are calculated (detected through arithmetic operations) as a feature point between two consecutive images of the images picked up by the nose-view cameras 3 for calculating a moving direction of the feature point and moving distance thereof as flow vectors. Moreover, the flow vectors are calculated throughout the entire area of the pickup image so that the information such as position and moving direction of an mobile object in the image are recognizable.

The approaching object detecting unit 12 is made to detect an object approaching the vehicle 2 on the basis of the flow vectors calculated in the optical flow calculating unit 11. Concretely, in the right- and left-side images, the approaching object to the own vehicle 2 is detected on the basis of a flow vector having a gradient or slope along (with respect to) a traveling direction of the vehicle 2. For example, in the case of the left-side image, a flow vector having a rightward vector component is extracted from the image and, in the case of the right-side image, a flow vector having a leftward vector component is extracted from the image. Moreover, a decision is made that the extracted flow vector is a flow vector generated by an object approaching the vehicle 2 (i.e., of mobile objects having flow vectors, an object approaching the own vehicle 2), there by making the recognition of the approaching object.

That is, although difficulty is encountered in making a decision as to whether or not a mobile object is approaching the own vehicle 2 only by recognizing the mobile object by using an optical flow, in this embodiment the approaching object detecting unit 12 extracts and selects, of mobile objects recognized by the optical flow calculating unit 11, a flow vector of an object approaching the own vehicle 2 on the basis of a region where it exists and a direction thereof and recognizes it. Thereby the approaching object detecting unit 12 recognizes the mobile object which can be dangerous approaching the own vehicle 2.

Moreover, the output unit 13 is for, when the approaching object detecting unit 12 has detected an approaching object toward the own vehicle 2, displaying the fact of the detection of the approaching object on the monitor 5 and further for notifying it to the occupant by means of sound or voice or the like. In this case, the output unit 13 makes the switching among a plurality of notification modes on the basis of the magnitude and number of flow vectors extracted by the approaching object detecting unit 12 and having a gradient along the traveling direction of the vehicle 2. Also the output unit 13 makes the display of an image and the notification on the detection of an approaching object.

That is, as regards the magnitude of a flow vector having a gradient along the traveling direction of the vehicle 2, when this flow vector is large, there is a high possibility of a danger to the own vehicle 2 even if the approaching object which develops this flow vector is at a distance from the own vehicle 2, for that it approaches the own vehicle 2 at a high speed. On the other hand, even if the mobile object is not approaching the own vehicle 2 at a high speed, when it exists near to the own vehicle, there is still a high possibility that the mobile object is dangerous. Also in this case, the flow vector having a gradient with respect to the traveling direction of the vehicle 2 becomes large.

Therefore, the degree of risk of the approaching object with respect to the vehicle 2 is seized as being increased with an increase in magnitude of the flow vector having a gradient along the traveling direction of the vehicle 2 and, hence, the switching among a plurality of notification modes is made in accordance with the degree of risk situation, and the display on the screen and the notification are carried out.

Likewise, when many objects approaching the own vehicle 2 exist or if an approaching object exists near to the vehicle 2, the number of flow vectors each having a gradient along the traveling direction of the vehicle 2 increases. Therefore, the degree of risk of the approaching object to the vehicle 2 is considered as being increased with an increase in number of flow vectors and, hence, the switching among plurality of notification modes is made in accordance with the degree of risk situation the display and the notification are carried out.

In this embodiment, the output unit 13 has a plurality of notification modes including a "low-risk notification mode" and a "high-risk notification mode" and makes the switching among these notification modes on the basis of the magnitude and number of flow vectors of an approaching object detected by the approaching object detecting unit 12.

That is, when the magnitude of an extracted flow vector having a gradient along a traveling direction of the vehicle 2 exceeds a predetermined value set in advance or when the number of extracted flow vectors having a gradient with respect to a traveling direction of the vehicle 2 exceeds a predetermined number set in advance, the output unit 13 is set in the "high-risk notification mode". In the other cases, it sets the "low-risk notification mode".

In the "low-risk notification mode", the output unit 13 displays one of flow vectors generated by an approaching object by using an arrow on the screen and notifies the fact of the detection of the approaching object by using voice (for example, announce "alert to an object around" or the like).

In addition, in the "high-risk notification mode", the output unit 13 emphatically displays (for example, change the luminance or color tone) an area on the screen corresponding to the approaching object detected by the approaching object detecting unit 12. Further, the output unit 13 displays all the flow vectors of the approaching object by using arrows and notifies the fact of the high degree of risk situation through voice to the occupant (for example, announce "alert to an approaching vehicle" or the like).

Incidentally, when the nose-view camera operation condition does not hold ($V \geq V_0$, or $\theta \geq \theta_0$), the output unit 13 also notifies this fact to the occupant.

The nose-view monitoring apparatus 1 according to this embodiment is thus constructed and executes the following control according to a flow chart of FIG. 3. This operational flow takes place on a predetermined cycle (for example, cycle synchronized with the image pickup cycle of the nose-view cameras 3) in the ECU 10 at all times.

In the operational flow, steps A10 to A30 are implemented as preliminary steps toward the calculation of an optical flow, and they are for making a decision as to whether or not each of the nose-view cameras 3 is in operation.

First, in the step A10, a decision is made as to whether or not the nose camera switch 6 is put into the on-state. If so, the operational flow advances to the step A20. If it is in the off-state, the operational flow comes to an end. Subsequently, in the step A20, a decision is made as to whether or not the traveling speed V of the vehicle is lower than the predetermined speed $V_0$. If $V<V_0$, the operational flow proceeds to the step A30. On the other hand, if $V \geq V_0$, the operational flow comes to an end. In the step A30, a decision is made as to whether or not the rudder angle θ of the steered wheel (steering angle of the steering wheel) is smaller than the predetermined angle $\theta_0$. If $\theta<\theta_0$, the operational flow goes to a step A40. On the other hand, if $\theta \geq \theta_0$, the operational flow comes to an end.

That is, when each of the nose view cameras 3 is in an non-operated condition, the operational flow terminates without advancing to the steps subsequent to the step A40. In other words, the operational flow advances to the steps subsequent to the step A40 only when the nose-view camera 3 is placed into operation.

In the step A40, the optical flow calculating unit 11 individually calculates feature points in the right- and left-side images taken by the nose-view cameras 3 and, in a step A50, calculates flow vectors in terms of all the feature points. That is, in this case, a mobile object is recognized in each of the right- and left-side images.

Following this, in a step A60, the approaching object detecting unit 12 makes a decision on whether or not each of all the flow vectors calculated in the step A50 has a vector component along (or on the side of) a traveling direction of the vehicle 2. With respect to the flow vector on the left-side image relative to the vehicle 2, a decision is made as to whether or not it has a rightward vector component in the image and, with respect to the flow vector on the right-side image relative thereto, a decision is made on whether or not it has a leftward vector component in the image. That is, in this case, of the mobile objects recognized in the step A50, the mobile object (approaching object) approaching the vehicle 2 is recognized in a state separated from the other objects.

Meanwhile, in the case of no detection of a flow vector having a vector component along the traveling direction of the vehicle 2, this signifies the absence of an approaching object and, hence, the operational flow comes to an end. On the other hand, if the aforesaid flow vector is detected, the operational flow proceeds to a step A70.

In the step A70, the output unit 13 displays the fact of the recognition of the approaching object on the monitor 5 and notifies it through voice to the occupant. In this case, for the notification to the occupant in the output unit 13, the notification mode is switched in accordance with the magnitude and number of flow vectors, detected in the step A60, which have a vector component along the traveling direction of the vehicle 2.

In a case in which, of the flow vectors of the approaching object detected in the step A60, there exists a flow vector having a magnitude larger than a predetermined value set in advance or if the number of approaching object flow vectors exceeds a predetermined value set in advance, the output unit 13 is set in the "high-risk notification mode" to emphatically display an area corresponding to the approaching object on the screen, and displays all the flow vectors on the approaching object by using arrows on the screen and notifies the fact of the high degree of risk situation through voice to the occupant.

Moreover, in a case in which, of the flow vectors of the approaching object detected in the step A60, there is no flow vector having a magnitude larger than the predetermined value set in advance or if the number of detected approaching object flow vectors does not reach the predetermined number set in advance, the output unit 13 is set in the "low-risk notification mode" to display one of the flow vectors generated by the approaching object by using an arrow on the screen, and notifies the fact of the detection of the approaching object through voice to the occupant.

The above-described control provides the following concrete effects.

In a case in which, at a T junction shown in FIG. 5, the vehicle 2 tries to proceed into an arterial road while confirming the lateral safe conditions, when the nose camera switch 6 of the vehicle 2 is manipulated into the on-state, if the vehicle 2 reduces the traveling speed before the arterial road so that it becomes lower than the predetermined speed $V_0$, the nose-view cameras 3 are automatically placed into operation to display the right- and left-side images on the monitor 5. This enables the right- and left-side images to be automatically displayed on the monitor 5 without requiring the occupant to pay attention to the switching of the image on the monitor 5. Moreover, in response to the operation of the nose-view cameras 3, the calculation of an optical flow in the pickup image starts in the ECU 10.

Furthermore, in a case in which the vehicle 2 stops at a position shown in FIG. 5, since the positions of the nose-view cameras 3 are in fixed conditions, as shown in FIG. 3A, no flow vector develops in background portions (which is background portions of vehicles 41 and 42 in the images; in this case, roads, buildings, guardrails and sky which do not move) in the pickup images, while only the flow vectors (indicated by black arrows in FIG. 3A) generated from the vehicles 41 and 42 which are objects approaching the vehicle 2 develop. At this time, with respect to the directions of the flow vectors related to the vehicles 41 and 42, the vehicle 41 develops a rightward vector component in the left-side image, that is, it forms a gradient with respect to the traveling direction of the vehicle 2 in the image. On the other hand, the vehicle 42 develops a leftward vector component in the right-side screen, and forms a gradient with respect to the traveling direction of the vehicle 2 in the image.

Therefore, the approaching object detecting unit 12 can detect the vehicles 41 and 42 as approaching objects on the basis of the flow vectors having a gradient along the traveling direction of the vehicle 2 in the right- and left-side images.

In addition, when the vehicle 2 is running (crawling) at a low speed (traveling speed: $V<V_0$) in a position shown in FIG. 5, that is, when the occupant is advancing the vehicle 2 slowly while confirming the lateral safe conditions, as shown in FIG. 3B, flow vectors (indicated by outline arrows in FIG. 3B) appear also in background portions in the pickup images due to the movements of the pickup positions of the nose-view cameras 3. Moreover, the flow vectors generated from the vehicle 41 and 42 develop as flow vectors (indicated by black arrows in FIG. 3B) which are the sum of the flow vectors which will appear when the vehicle 2 is in a stopping condition (i.e., the flow vectors indicated by the black arrows in FIG. 3A) and the flow vectors of the background portions which appear due to the movements of the positions of the nose-view cameras 3 (i.e., the flow vectors indicated by the outline arrows). The flow vectors of the background portions develop as flow vectors having a gradient along a direction opposite to the traveling direction of the vehicle 2 in the image when the vehicle 2 advances.

Accordingly, although the magnitude and direction of the flow vectors originating from the vehicles 41 and 42 vary (deform) when the vehicle 2 advances slowly, if the vehicle 2 is slowly moving at a low speed, a great variation does not occur and, hence, a gradient appears along the traveling direction of the vehicle 2 in the image. Moreover, even if, of the flow vectors originating from the vehicles 41 and 42, the gradient with respect to the vehicle traveling direction becomes equivalent to the flow vector of the background portion, since the flow vectors originating from the vehicles 41 and 42 include vectors in enlarging directions in the image, i.e., in vertical directions in the image, due to the approach to the vehicle 2, the counteraction on the flow vectors originating from the vehicles 41 and 42 does not occur.

At this time, as shown in FIG. 3C, the directions of the flow vectors due to the vehicles 41 and 42 are vector directions each having a gradient along the traveling direction of the vehicle 2, that is, a direction of a rightward vector component in the left-side region and a direction of a leftward vector component in the right-side region. In other words, in the left-side region, it is a flow vector having a direction in a clockwise range of 180 degrees with respect to a vertical direction (from 0 o'clock direction to 6 o'clock direction), and in the right-side region, it is a flow vector having a direction in a counterclockwise range of 180 degrees with respect to a vertical direction (from 6 o'clock direction to 12 o'clock direction).

Furthermore, the approaching object detecting unit 12 can detect the vehicles 41 and 42 as approaching objects on the basis of the flow vectors each having a gradient along the vehicle traveling direction in the right- and left-side images. Therefore, the output unit 13 of the ECU 10 outputs the fact of the detection of the approaching objects to the monitor 5 to alert the occupant.

Still furthermore, the output unit 13 makes the switching of the notification mode in accordance with a degree of risk of the approaching object to the own vehicle 2, which enables the effective notification of the degree of risk to the occupant and enhances the safety.

Incidentally, in a case in which the vehicle 2 advances quickly, because of an increase in the flow vector corresponding to the background portion which develops due to the movement of the position of the nose-view cameras 3, it is considered that, with respect to the directions of the flow vectors originating from the vehicles 41 and 42, a gradient with respect to the traveling direction of the vehicle 2 disappears in the image. However, in this embodiment, since the operations of the nose-view cameras 3 are suspended when the traveling speed V of the vehicle 2 is equal to or higher than the predetermined speed $V_0$, the mistaken recognition on an approaching object is preventable. Likewise, since the operations of the nose-view cameras 3 come to a stop when the steering angle θ of the vehicle 2 is equal to or larger than the predetermined angle $θ_0$, the mistaken recognition on an approaching object due to the turning movement is avoidable. In consequence, this can enhance the accuracy of detection of an approaching object based on the optical flow.

In addition, even in the case of the suspension of the operations of the view-nose cameras 3, the output unit 13 notifies this fact to the occupant, which can alert the occupant and enhance the safety.

Although the values of the predetermined speed $V_0$ and the predetermined angle $θ_0$ can arbitrarily be set according to the mode of implementation, when the vehicle 2 moves, as the traveling speed V and steering angle θ thereof increase, the aforesaid flow vector of the background portion becomes larger. Accordingly, for the detection of an object approaching at a high speed, no problem arises even if the predetermined speed $V_0$ and the predetermined angle $θ_0$ are set at high values. On the other hand, for the detection of an object approaching at a low speed, it is desirable that the vehicle 2 is in a stopping condition. However, in a case in which the vehicle 2 is on the movement, by using a difference in directivity or directionality between the flow vectors originating from the vehicles 41 and 42 which are approaching object traveling on a general public way and the flow vectors developing in conjunction with the background portion (that is, by the above-mentioned logic), the vehicles 41 and 42 which are approaching objects can be recognized in a state discriminated from the background portion.

As described above, with the nose-view monitoring apparatus according to the present invention, even if the vehicle 2 is in a stopping condition, and even in the case of a low-speed ($V<V_0$) run, or even in a state where the steering angle is smaller than a predetermined angle ($θ<θ_0$), an approaching object in lateral regions relative to a vehicle is easily reliably recognizable and the movement of a background image can be prevented from being mistaken for an approaching object, thereby improving the accuracy of detection on an approaching object. Moreover, of mobile objects to be recognized on the basis of an optical flow, an approaching object which is dangerous to the own vehicle 2 is recognizable with a simple arrangement, and the arithmetic throughput of the ECU 10 needed for the recognition of an approaching object is reducible. Still moreover, the notification to be made according to a degree of risk can improve the safety.

[Second Embodiment]

Furthermore, a description will be given hereinbelow of a nose-view monitoring apparatus according to a second embodiment of the present invention. The same components as those in the first embodiment will be marked with the same reference numerals, and the description thereof will be omitted for brevity.

Figure 6:
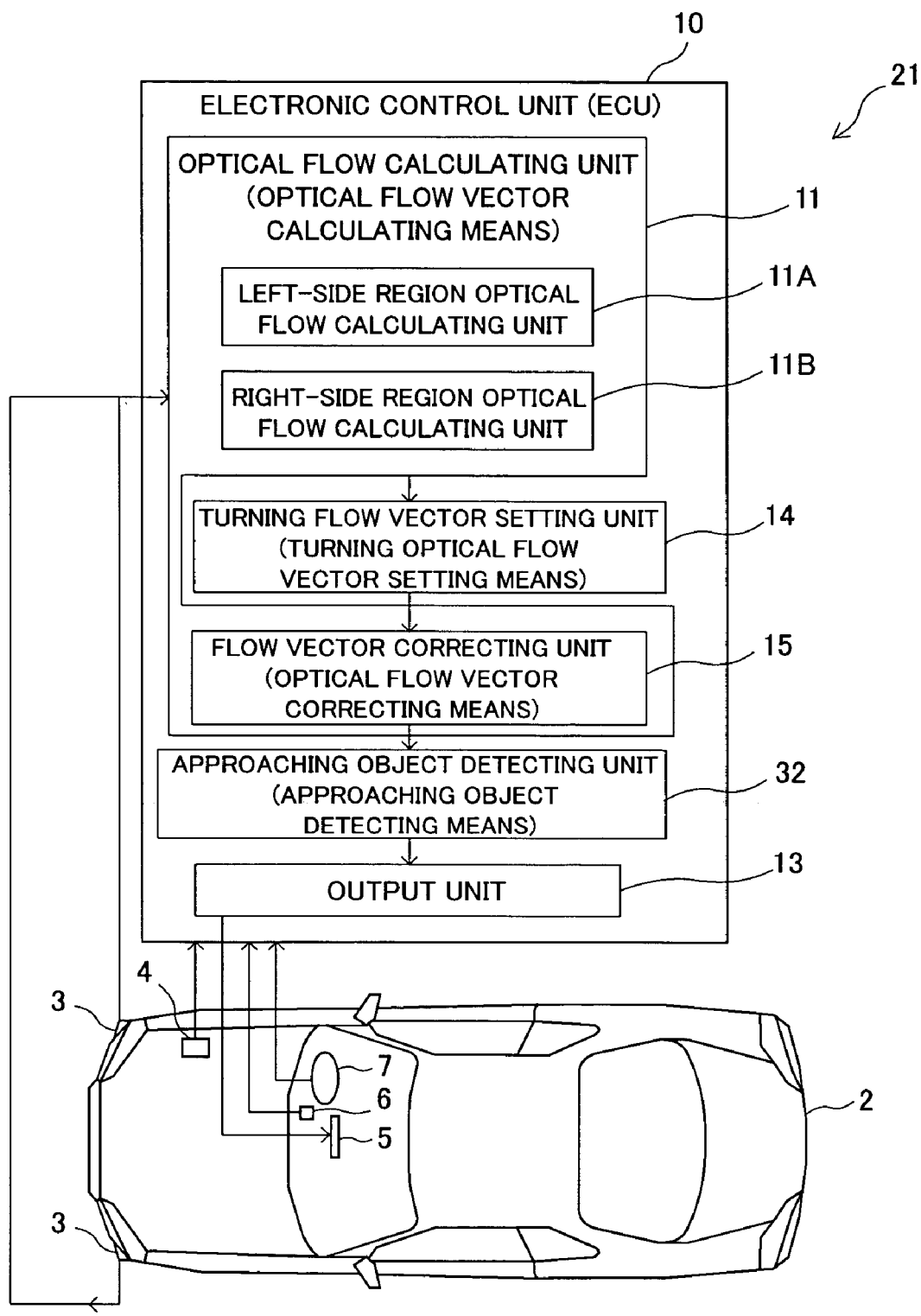
FIG. 6 is an illustrative view showing a configuration of a vehicle equipped with a nose-view monitoring apparatus according to a second embodiment of the present invention.

FIG. 6 shows a vehicle 2 equipped with a nose-view monitoring apparatus 21 according to a second embodiment of the present invention. The vehicle 2 is provided with nose-view cameras (image pickup means) 3 each for picking up an image of each of right- and left-side lateral regions relative to the vehicle 2, a vehicle speed sensor (turning state corresponding value detecting means) 4 for detecting a signal indicative of a traveling speed of the vehicle 2, a nose camera switch 6 serving as a switch for an operation of each of the nose-view cameras 3, a steering angle sensor (turning direction detecting means/turning state corresponding value detecting means) 7 for detecting a signal indicative of a steering angle of a steering wheel (or rudder angle of a steered wheel) manipulated by an occupant, an electronic control unit (ECU) 10 and a monitor (notification means) 5 for displaying an image taken through each of the nose-view cameras 3.

In the second embodiment, the ECU 10 is designed to make a decision, on the basis of the sign of the rudder angle θ of the steered wheel, as to whether the turning direction of the vehicle 2 is a rightward direction or a leftward direction. For example, with reference to the neutral state where the steering wheel is not shifted, the ruder angle θ becomes positive in the case of the rightward turn, while it becomes negative for the leftward turn.

In addition, the ECU 10 is made up of an optical flow calculating unit (optical flow vector calculating means) 11 made to calculate an optical flow vector(s) in a pickup image and equipped with a flow vector correcting unit (optical flow vector correcting means) 15, a turning flow vector setting unit (turning optical flow vector setting means) 14 made to calculate a turning optical flow vector(s) developing due to a turn of the vehicle 2, an approaching object detecting unit (approaching object detecting means) 32 made to detect an approaching object toward the own vehicle on the basis of an optical flow vector(s) corrected in the flow vector correcting unit 15, and an output unit 13 made to output these calculation/detection results.

The turning flow vector setting unit 14 is made to set a turning flow vector (turning optical flow vector) developing due to a turn of the vehicle 2 in each of the right- and left-side images relative to the vehicle 2, on the basis of the turning direction of the vehicle 2 decided from the sign of the rudder angle $\theta$ of the steered wheel, a traveling speed of the vehicle 2 and the rudder angle $\theta$ of the steered wheel of the vehicle 2. The turning flow vector to be set in this case is a flow vector developing due to the movement of the entire pickup image of each of the nose-view cameras 3 due to the turning of the vehicle 2 and, for example, as shown in FIG. 3E, it corresponds to each of the flow vectors (indicated by outline arrows) originating from a background portion of the image.

First, in the pickup image taken by each of the nose-view cameras 3, the turning flow vector to be set in this case is set with respect to only a feature point calculated in the optical flow calculating unit 11.

Secondly, the direction of the turning flow vector is set at an outward direction relative to a turning direction of the vehicle 2 [in this case, a horizontal direction (abeam direction) in the image]. For example, since the vehicle 2 turns rightwards when the sign of the rudder angle $\theta$ is positive, the direction of the turning flow vector is set at a leftward direction (left-hand horizontal direction) in the pickup image. Moreover, since the vehicle 2 turns leftwards when the sign of the rudder angle $\theta$ is negative, the direction of the turning flow vector is set at a rightward direction (right-hand horizontal direction) in the pickup image.

In addition, the magnitude of the turning flow vector is uniquely set on the basis of a turning speed (turning angular velocity) of the vehicle calculated from a traveling speed V and a rudder angle $\theta$ with respect to each of the left-side area and the right-side area in a pickup image taken by the nose-view cameras 3. For example, in the left-side area of the pickup image, all the flow vectors of a background portion developing due to a turn of the vehicle 2 are set as vectors having the same magnitudes, and the magnitude of the vector is set to make the one-to-one correspondence with respect to the turning speed of the vehicle 2.

That is, the accurate calculation of a flow vector of a background portion occurring (turning flow vector) due to a turn of the vehicle 2 requires the detection of a distance up to each of static objects constituting a background and an angle made with respect to an image pickup direction of the nose-view cameras 3 and, further, the calculation of a turning flow vector of each of the static objects. However, in this embodiment, the turning flow vector can be set with the above-mentioned simple logic. Therefore, in this embodiment, the turning flow vector setting unit 14 can collectively set all the turning flow vectors of a portion corresponding to the background with respect to each of the left- and right-side areas of an pickup image only when inputted are the rudder angle $\theta$ of the vehicle 2 and the traveling speed V thereof.

The flow vector correcting unit 15 subtracts the turning flow vector, calculated in the turning flow vector setting unit 14, from the optical flow vector of the pickup image to calculate and set a corrected flow vector (in the following description, the flow vector calculated as a result of the correction in the flow vector correcting unit 15 will be referred to as a "corrected flow vector"). That is, this provides a function to, of the optical flow extracted from a pickup image taken through the nose-view cameras 3, remove a turning flow vector corresponding to a background portion.

The approaching object detecting unit 32 is made to detect an object approaching the vehicle 2 on the basis of a corrected flow vector set in the flow vector correcting unit 15. Concretely, an approaching object toward the own vehicle 2 is detected on the basis of a flow vector having a vector component along a traveling direction of the vehicle 2. For example, in a left-side image, there is extracted a corrected flow vector having a rightward vector component in the image, while in a right-side image, there is extracted a corrected flow vector is extracted having a leftward vector component therein. Moreover, a decision is made that the extracted corrected flow vectors are flow vectors generated by an object approaching the vehicle 2 (that is, of all mobile objects having flow vectors in the pickup image, an object approaching the own vehicle except a background portion), thereby recognizing the approaching object.

In other words, although the approaching object detecting unit 12 in the first embodiment has a function to detect an approaching object by directly using an optical flow calculated in the optical flow calculating unit 11, the approaching object detecting unit 32 in this second embodiment has a function to detect an approaching object by using a corrected optical flow instead of the optical flow itself calculated in the optical flow calculating unit 11.

In addition, in this second embodiment, for the purpose of absorbing an setting error in the turning flow vector setting unit 14 made to set a turning flow vector, instead of all the corrected flow vectors detected through the above-mentioned logic being flow vectors generated by an object approaching the own vehicle, the flow vectors whose magnitude exceeds a predetermined value set in advance are decided as being flow vector originating from the object approaching the own vehicle 2.

Figure 7:
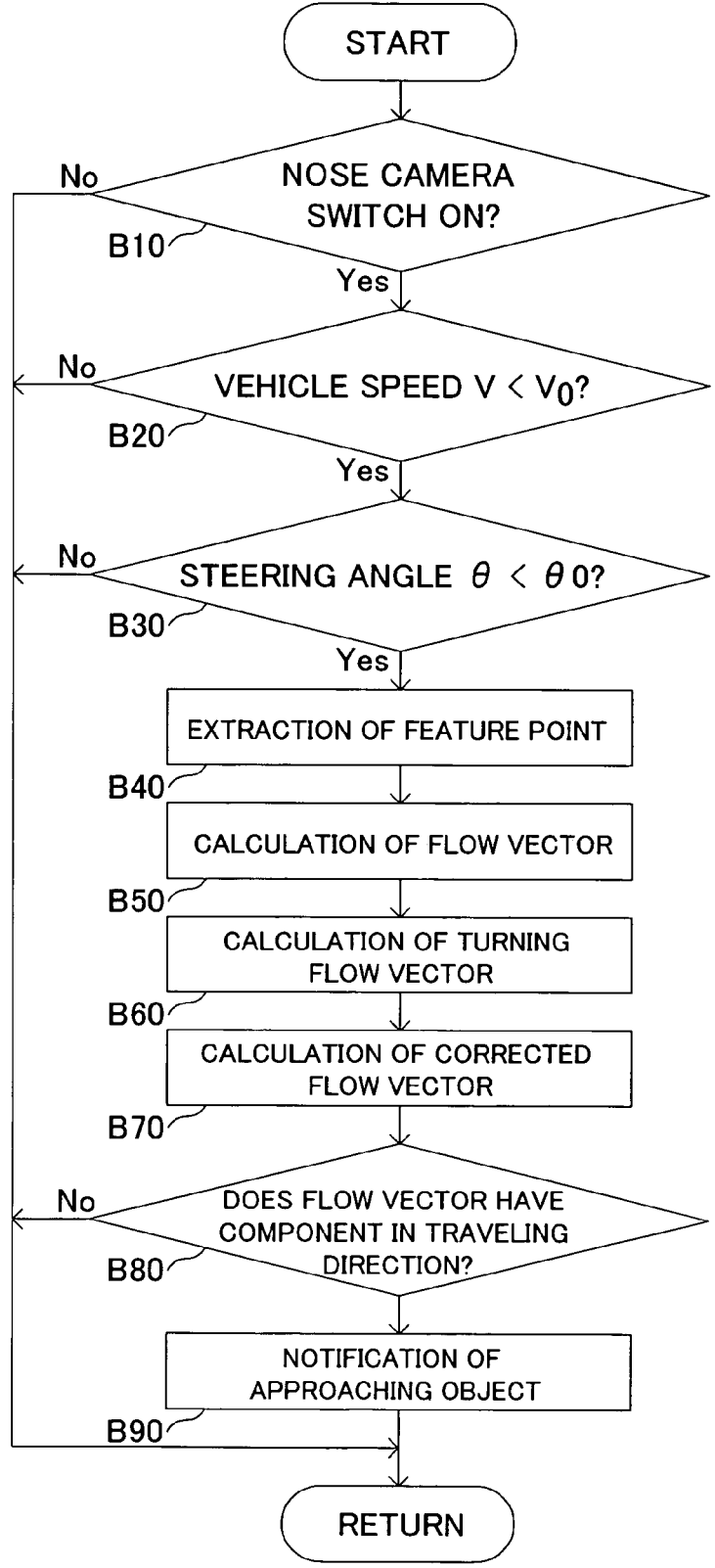
FIG. 7 is a flow chart useful for explaining control in the nose-view monitoring apparatus according to the second embodiment of the present invention.

The nose-view monitoring apparatus 21 thus arranged according to the second embodiment executes the following control according to a flow chart shown in FIG. 7.

In the operational flow, steps B10 to B30 are implemented as preliminary steps toward the calculation of an optical flow, and they are for making a decision as to whether or not each of the nose-view cameras 3 is in operation.

First, in the step B10, a decision is made as to whether or not the nose camera switch 6 is put into the on-state. If so, the operational flow advances to the step B20. If it is in the off-state, the operational flow comes to an end. Subsequently, in the step B20, a decision is made as to whether or not the traveling speed V of the vehicle is lower than the predetermined speed $V_0$. If $V<V_0$, the operational flow proceeds to the step B30. On the other hand, if $V \geq V_0$, the operational flow comes to an end. In the step B30, a decision is made as to whether or not the rudder angle $\theta$ of the steered wheel is smaller than the predetermined angle $\theta_0$. If $\theta < \theta_0$, the operational flow goes to a step B40. On the other hand, if $\theta \geq \theta_0$, the operational flow comes to an end.

That is, when each of the nose view cameras 3 is in an non-operated condition, the operational flow terminates without advancing to the steps subsequent to the step B40. In other words, the operational flow advances to the steps subsequent to the step B40 only when the nose-view camera 3 is placed into operation.

In the step B40, the optical flow calculating unit 11 individually calculates feature points in the right- and left-side images taken by the nose-view cameras 3 and, in a step B50, calculates flow vectors in terms of all the feature points. That is, in this case, a mobile object is recognized in each of the right- and left-side images.

Following this, in a step B60, the turning flow vector setting unit 14 sets a turning flow vector on the basis of the rudder angle θ of the steered wheel and the traveling speed V. The turning flow vector to be set in this case is limited to the flow vector about the feature point calculated in the step B50. Moreover, in a step B70, the flow vector correcting unit 15 subtracts the turning flow vector, set in the step B60, from the flow vector calculated in the step B50 to calculate the corrected flow vector. That is, in this case, the corrected flow vectors are calculated in terms of all the feature points calculated in the step B50.

Then, in a step B80, the approaching object detecting unit 32 makes a decision as to whether or not each of all the corrected flow vectors calculated in the step B70 has a vector component along a traveling direction of the vehicle 2. With respect to the corrected flow vector in the image on the left side of the vehicle 2, a decision is made on whether or not it has a vector component in a rightward direction in the image, and with respect to the corrected flow vector in the image on the right side of the vehicle 2, a decision is made on whether or not it has a vector component in a leftward direction in the image. That is, in this case, of the mobile objects recognized in the step B40, a mobile object (approaching object) approaching the vehicle 2 is recognized in a state discriminated from others.

At this time, if there is no detection of a corrected flow vector having a vector component in a traveling direction of the vehicle 2 (or, if the magnitude of the detected corrected flow vector is smaller than a predetermined value), there is the absence of the approaching object (or, the object is not approaching because the magnitude of vector generated by the object still remains within a range of the detection error.) and, hence, the operational flow comes to an end. On the other hand, in the case of the detection of the aforesaid flow vector (and when the detected corrected flow vector is equal to or larger than the predetermined value), the operational flow goes to a step B90.

In the step B90, the output unit 13 displays the fact of the recognition of the approaching object on the monitor 5 and notifies it through sound or voice to the occupant. In this case, for the notification from the output unit 13 to the occupant, the switching among notification modes is made in accordance with the magnitude and number of corrected flow vectors detected in the step B70 and each having a vector component along a traveling direction of the vehicle 2.

In a case in which, of the corrected flow vectors on the approaching object detected in the step B60, there is detected a corrected flow vector having a magnitude larger than a predetermined magnitude set in advance, or if the number of corrected flow vectors generated by the approaching object exceeds a predetermined number set in advance, the output unit 13 is set in a "high-risk notification mode" and emphatically displays an area corresponding to the approaching object in the screen, and displays all the corrected flow vectors originating from the approaching object on the screen by using arrows and notifies the fact of the high degree of risk situation through sound or voice to the occupant. Then, this operational flow comes to an end.

On the other hand, in a case in which, of the corrected flow vectors on the approaching object detected in the step B60, there does not exist a corrected flow vector having a magnitude larger than the predetermined magnitude set in advance, and if the number of corrected flow vectors generated by the approaching object does not reach the predetermined number set in advance, the output unit 13 is set in a "low-risk notification mode" to display one of the corrected flow vectors generated by the approaching object on the screen by using an arrow and notify the fact of the detection of the approaching object through sound or voice to the occupant. Then, this operational flow comes to an end.

The above-described control provides the following concrete effects.

In a case in which, at a T junction shown in FIG. 5, the vehicle 2 tries to proceed into an arterial road while confirming the lateral safe conditions, when the nose camera switch 6 of the vehicle 2 is manipulated into the on-state, if the vehicle 2 reduces the traveling speed before the arterial road so that it becomes lower than the predetermined speed $V_0$, the nose-view cameras 3 are automatically placed into operation to display the right- and left-side images on the monitor 5. This enables the right- and left-side images to be automatically displayed on the monitor 5 without requiring the occupant to pay attention to the switching of the image on the monitor 5. Moreover, in response to the operation of the nose-view cameras 3, the calculation of an optical flow in the pickup image starts in the ECU 10.

[Stopping Condition]

In a case in which the vehicle 2 is stopping at a position shown in FIG. 5 in a neutral steering condition, as shown in FIG. 3A, the positions of the nose-view cameras 3 are fixed and, hence, no flow vector appears in the background portion (background portion of the vehicles 41 and 42 in the image; in this case, roads, buildings, guard rails and sky which do not move) in the pickup images, while only the flow vectors (indicated by black arrows in FIG. 3A) generated by the vehicles 41 and 42 which are objects approaching the vehicle 2 develop. At this time, since the turning speed to be calculated on the basis of the rudder angle θ and the traveling speed V becomes zero and the vehicle 2 is not turning, the magnitude of the turning flow vector is set at zero, and the flow vector originating from each of the vehicles 41 and 42 which are objects approaching the vehicle 2 becomes intact a corrected flow vectors.

In this case, with respect to the direction of the corrected flow vector (flow vector originating from each of the vehicles 41 and 42), the vehicle 41 develops a rightward vector component in the left-side image, that is, it forms a vector component along the traveling direction of the vehicle 2 in the image. On the other hand, the vehicle 42 develops a leftward vector component in the right-side screen, and forms a vector component along the traveling direction of the vehicle 2 in the image.

Therefore, the approaching object detecting unit 32 can detect the vehicles 41 and 42 on the basis of the flow vectors having vector components along the traveling direction of the vehicle 2 in the right- and left-side images.

[Turning Condition]

Moreover, in a case in which the vehicle 2 is turning rightwards from the position shown in FIG. 5 at a low speed (traveling speed $V<V_0$), that is, when the occupant steers the vehicle 2 in a rightward direction intended while confirming the lateral safe condition and advancing the vehicle 2 slowly, as shown in FIG. 3D, flow vectors (indicated by outline arrows in FIG. 3D) develop even in a background portion of a pickup image due to the movements of the image pickup positions of the nose-view cameras 3. Moreover, the flow vectors (indicated by the black arrows in FIG. 3D) originating from the vehicles 41 and 42 develop as the sum of the flow vectors (i.e., the flow vectors indicated by the black arrows in FIG. 3A) which will develop when the vehicle 2 is in a stopping condition and the flow vectors (the flow vectors indicated by the outline arrows therein) generated by the background portion due to the positional movements of the nose-view cameras 3. Still moreover, the flow vectors on the background portion appear as flow vectors each having a vector component in a leftward direction relative to the vehicle in the image.

At this time, since the vehicle 2 is turning rightwards, the turning flow vector setting unit 14 sets the direction of the turning flow vector at a leftward direction in the image and sets the magnitude of the turning flow vector in a one-to-one correspondence with respect to the right- and left-side areas of the pickup image on the basis of a turning speed calculated from the rudder angle $\theta$ and the traveling speed V (see white arrows in FIG. 3E). Moreover, the flow vector correcting unit 15 subtracts the turning flow vectors shown in FIG. 3E from the flow vectors shown in FIG. 3D, thus calculating corrected flow vectors shown in FIG. 3F.

At this time, as shown in FIG. 3F, the directions of the corrected flow vectors originating from the vehicles 41 and 42 are the directions of vectors having a vector component along a traveling direction of the vehicle 2 in the image: in the left-side area, a direction in which a rightward vector component lies, while in the right-side area, a direction in which a leftward vector component lies. In other words, in the left-side area, it signifies a flow vector in a direction in a clockwise range of 180 degrees with respect to the vertical direction, while it denotes a flow vector in a direction in a counterclockwise range of 180 degrees with respect to the vertical direction.

Therefore, the approaching object detecting unit 32 can detect the vehicles 41 and 42, which are approaching objects, on the basis of the flow vectors each having a vector component along or on the side of the vehicle's traveling direction. Moreover, the output unit 13 of the ECU 10 outputs the fact of the detection of the approaching objects to the monitor 5 and alert the occupant to it.

In addition, the output unit 13 makes the switching among notification modes in accordance with a degree of risk of an approaching object to the own vehicle 2, which enables the effective notification of the risk situation to the occupant and achieves the improvement of the safety.

In this connection, since a flow vector of a background portion developing due to a positional movement of the nose-view cameras 3 increases when the vehicle 2 advances excessively and promptly, although it can be considered that a vector component along the traveling direction of the vehicle 2 does not develop in the direction of a flow vector originating from each of the vehicles 41 and 42 in the image, in this embodiment the operations of the nose-view cameras 3 are made to suspend when the traveling speed V of the vehicle 2 exceeds the predetermined speed $V_0$ ($0<V_0$) so that the mistaken recognition on an approaching object becomes preventable. Likewise, since the operations of the nose-view cameras 3 are made to suspend when the steering angle $\theta$ of the vehicle 2 exceeds the predetermined angle $\theta_0$ ($0<\theta_0$), the mistaken recognition on an approaching object does not occur due to a turning movement. This consequently improves the accuracy of detection of an approaching object based on an optical flow.

Moreover, even if the operations of the nose-view cameras 3 come to a stop because of no satisfaction of the nose-view camera operation condition, the output unit 13 notifies this fact to the occupant to alert the occupant thereto, which can enhance the safety.

Although the values of the predetermined speed $V_0$ and the predetermined angle $\theta_0$ can arbitrarily be set according to the mode of implementation, when the vehicle 2 turns, as the traveling speed V and steering angle $\theta$ thereof increase, the aforesaid flow vector of the background portion becomes larger. Accordingly, for the detection of an object approaching at a high speed, no problem arises even if the predetermined speed $V_0$ and the predetermined angle $\theta_0$ are set at high values. On the other hand, for the detection of an object approaching at a low speed, it is desirable that the vehicle 2 is in a stopping condition. However, in a case in which the vehicle 2 is on the turning, by using a difference in directivity between the flow vectors originating from the vehicles 41 and 42 which are approaching object traveling on a general public way and the flow vectors developing in conjunction with the background portion (that is, by the above-mentioned logic), the vehicles 41 and 42 which are approaching objects can be recognized in a state discriminated from the background portion.

As described above, with the nose-view monitoring apparatus 21 according to the second embodiment of the present invention, even if the vehicle 2 is on the turn, a turning flow vector developing due to the turn of the vehicle 2 can be set on the basis of a turning direction and turning state of the vehicle 2, thereby simplifying the correction calculations related to the turning of the own vehicle 2, i.e., the arithmetic operations in the turning flow vector setting unit 14. In addition, the direction of this turning flow vector is set in an outward direction relative to the turning direction and the magnitude thereof is set uniquely on the basis of a parameter (rudder angle $\theta$ and traveling speed V) corresponding to the turning state, which can simplify the arithmetic operations and reduce the arithmetic throughput.

In addition, an approaching object in lateral regions at the turning of the vehicle can easily and reliably be recognized by using the above-mentioned logic, and the movement of a background portion is preventable from being mistaken for an approaching object, thus achieving the enhancement of the accuracy of detection of the approaching object. Still additionally, of mobile objects to be recognized on the basis of an optical flow, an approaching object which is dangerous to the own vehicle 2 is recognizable with a simple arrangement, and the arithmetic throughput of the ECU 10 for the recognition of an approaching object is further reducible. Yet additionally, the safety is improvable by means of the notification according to a degree of risk situation.

Incidentally, with respect to a turning flow vector setting method in the turning flow vector setting unit 14, although in the above-described second embodiment the direction of the turning flow vector is set at an outward direction relative to a turning direction of the vehicle 2 (in this case, a right-abeam direction in the image) and the magnitude of the turning flow vector is set at a value based on the turning speed (turning angular velocity), the present invention is not limited to this setting method. For example, it is also appropriate that the direction of the turning flow vector is corrected in accordance with the degree of turning speed of the vehicle 2, or that a predetermined gain is set in advance in accordance with the position of a feature point in a pickup image so that a value obtained by multiplying the magnitude of a vector set on the basis of the turning speed of the vehicle 2 by the predetermined gain is set as a turning flow vector.

In addition, although in the above-described second embodiment turning flow vectors with the same magnitude are set in the right- and left-side areas of a pickup image, there is no need to always set all the magnitudes of turning flow vectors to be set in the turning flow vector setting unit 14 at the same values with respect to the right- and left-side areas of the pickup image, and it is also appropriate that, for example, they are set on the basis of a vehicle turning speed (turning angular velocity) calculated from the traveling speed V and the rudder angle θ in accordance with a position on the pickup image.

Still additionally, although in the above-described second embodiment a traveling speed V of the vehicle 2 and a rudder angle θ of a steered wheel are used as a parameter corresponding to a turning state of the vehicle 2, it is also acceptable that, for example, a turning angular velocity of the vehicle 2 is used as the parameter corresponding to the turning state thereof. In this case, an angular velocity sensor or a gyro device is provided which is for detecting an angular velocity of the vehicle 2. Moreover, these parameters can be set at the vehicle occupant's option.

As mentioned above, a setting method based upon a parameter(s) corresponding to a turning direction of the vehicle 2 and a turning state thereof can be determined at his/her option.

Furthermore, although in the foregoing second embodiment the approaching object detecting unit 32 is made to detect an approaching object on the basis of, of corrected flow vectors, the vector components along a traveling direction of the vehicle 2 in the image, it is also possible to detect an approaching object by using a different logic. The approaching object detecting method can also be taken at his/her option.

[Third Embodiment]

Furthermore, a description will be given hereinbelow of a nose-view monitoring apparatus 31 according to a third embodiment of the present invention. The same parts as those in the first and second embodiments will be marked with the same reference numerals, and the description thereof will be omitted for simplicity.

Figure 8:
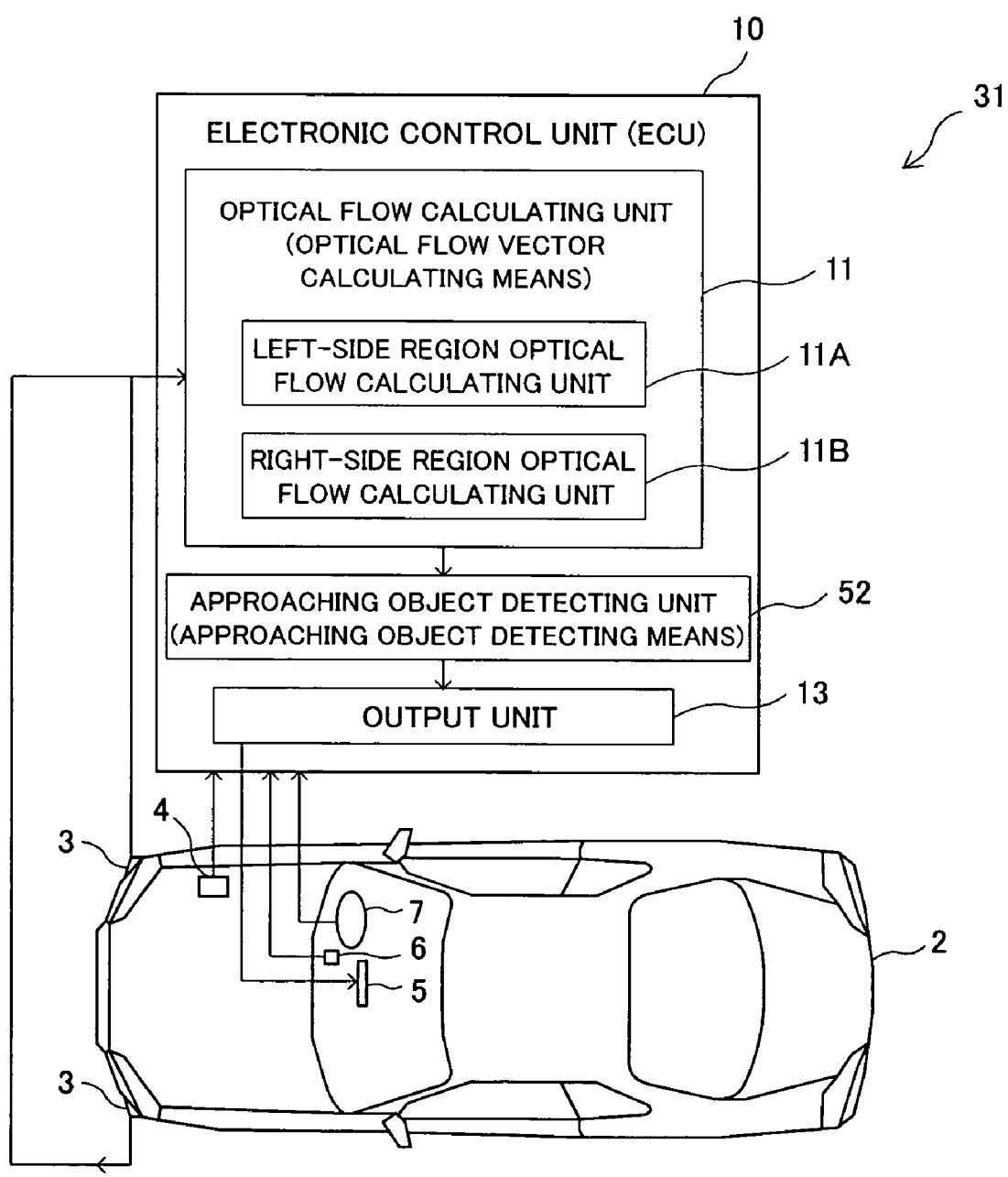
FIG. 8 is an illustrative view showing a configuration of a vehicle equipped with a nose-view monitoring apparatus according to a third embodiment of the present invention.

FIG. 8 shows a vehicle 2 equipped with this nose-view monitoring apparatus 31. The vehicle 2 is provided with nose-view cameras (image pickup means) 3 each for picking up an image of each of right- and left-side lateral regions relative to the vehicle 2, a vehicle speed sensor 4 for detecting a signal indicative of a traveling speed of the vehicle 2, a nose camera switch 6 serving as a switch for an operation of each of the nose-view cameras 3, a steering angle sensor (turning direction detecting means) 7 for detecting a signal indicative of a steering angle of a steering wheel (or rudder angle of a steered wheel) manipulated by an occupant, an electronic control unit (ECU) 10 and a monitor (notification means) 5 for displaying an image taken through each of the nose-view cameras 3.

The ECU 10 is designed to calculate an optical flow in each of the right- and left-side pickup images taken through the nose-view cameras 3 for detecting a mobile object approaching the own vehicle, and it is made up of an optical flow calculating unit (optical flow vector calculating means) 11 made to calculate an optical flow vector(s) in a pickup image, an approaching object detecting unit (approaching object detecting means) 52 made to detect an approaching object toward the own vehicle on the basis of the optical flow vector(s) calculated in the optical flow calculating unit 11, and an output unit 13 made to output these calculation/detection results.

The approaching object detecting unit 52 is made to detect an object approaching the vehicle 2 on the basis of flow vectors calculated in the optical flow calculating unit 11. However, in this case, the approaching object detecting unit 12 is made to detect the approaching object by referring to only the flow vectors in the lateral regions with respect to an outward direction relative to a turning direction of the vehicle 2 detected by a steering angle sensor.

Concretely, first, in a case in which the rudder angle θ of the vehicle 2 is positive and is larger than a reference value $\theta_1$ ($\theta_1 < \theta_0$) set in advance (that is, when the rightward turning speed is somewhat high), the detection of an approaching object is made on the basis of a flow vector(s) in a left-side region relative to the vehicle 2. That is, in the image of the left-side region, a flow vector having a rightward vector component is extracted, and the extracted flow vector is decided as being a flow vector generated by an object approaching the vehicle 2 (that is, of mobile objects each having a flow vector, an object approaching the own vehicle 2), thus recognizing the approaching object. At this time, reference is not made to the flow vector in the right-side area relative to the vehicle 2. That is, the detection of an approaching object is not made with respect to the right-side region.

On the other hand, if the rudder angle θ is negative and is smaller than a reference value $-\theta_1$ (that is, if the leftward turning speed is somewhat high), the detection of an approaching object is made on the basis of a flow vector in the right-side region relative to the vehicle 2. That is, in the image of the right-side region, a flow vector having a leftward vector component is extracted, and the extracted flow vector is decided as being a flow vector generated by an object approaching the vehicle 2, thus recognizing the approaching object. At this time, reference is not made to the flow vector in the left-side area relative to the vehicle 2. That is, the detection of an approaching object is not made with respect to the left-side region.

Moreover, in a case in which the rudder angle θ of the vehicle 2 is below the reference value $\theta_1$ (that is, when the turning speed is low), the detection of an approaching object is made on the basis of flow vectors in right- and left-side regions relative to the vehicle 2.

The reason that the approaching object detecting unit 52 is thus arranged is as follows. That is, in a case in which it is considered that an mobile object such as a vehicle approaching the own vehicle 2 is recognized from a nose-view image taken with respect to right- and left-side regions relative to the vehicle 2 by using an optical flow, since, assuming that the own vehicle 2 is in a stopping condition, no flow vector develops for an object whose relation position does not vary relative to the own vehicle 2, a mobile object exists at the position where a flow vector appears so that the mobile object is reliably detectable on the basis of the presence or absence of a flow vector.

However, when the vehicle is on the turn, as regards the nose-view image taken with respect to lateral regions, the angle (composition) itself moves together in a direction opposite to the turning direction. For example, when the vehicle 2 is turning rightwards, as shown in FIG. 3D, both the right- and left-side images taken through the nose-view cameras 3 move leftwards, and the leftward flow vectors (flow vectors originating from the turn of the vehicle 2, i.e., the flow vectors indicated by white arrows in FIG. 3D) are detected throughout the entire screen. Therefore, in a case in which a mobile object such as a vehicle approaching the vehicle 2 exists actually, in the left-side image relative to the vehicle 2, the flow vectors (indicated by black arrows in the left-side image in FIG. 3D) originating from the approaching object and the flow vectors (indicated by white arrows in the left-side image in FIG. 3D) generated by the turn of the vehicle 2 are separately recognizable taking node of the difference in directivity between the vectors. However, in the right-side image relative to the vehicle 2, the flow vectors (indicated by black arrows in the right-side image in FIG. 3D) originating from the approaching object and the flow vectors (indicated by white arrows in the right-side image in FIG. 3D) generated by the turn of the vehicle 2 are similar in vector direction to each other and, hence, difficulty is encountered in recognizing them discriminately. Moreover, the flow vector generated by the turn of the vehicle 2 increases with an increase in turning rudder angle (or, for example, turning speed and others) of the vehicle so that the similarity in direction therebetween becomes higher, which makes it further difficult to recognize them discriminately.

For this reason, according to this third embodiment, in a case in which the vehicle 2 is turning and the turning speed is somewhat high, the approaching object detecting unit 52 makes reference to only the flow vectors in the lateral regions with respect to an outward direction relative to the turning direction for detecting an approaching object so that the flow vectors generated by the approaching vehicle and the flow vectors originating from the turning of the vehicle 2 can discriminately be recognized on the basis of the difference in vector directionality, thereby reducing the mistaken recognition.

Figure 9:
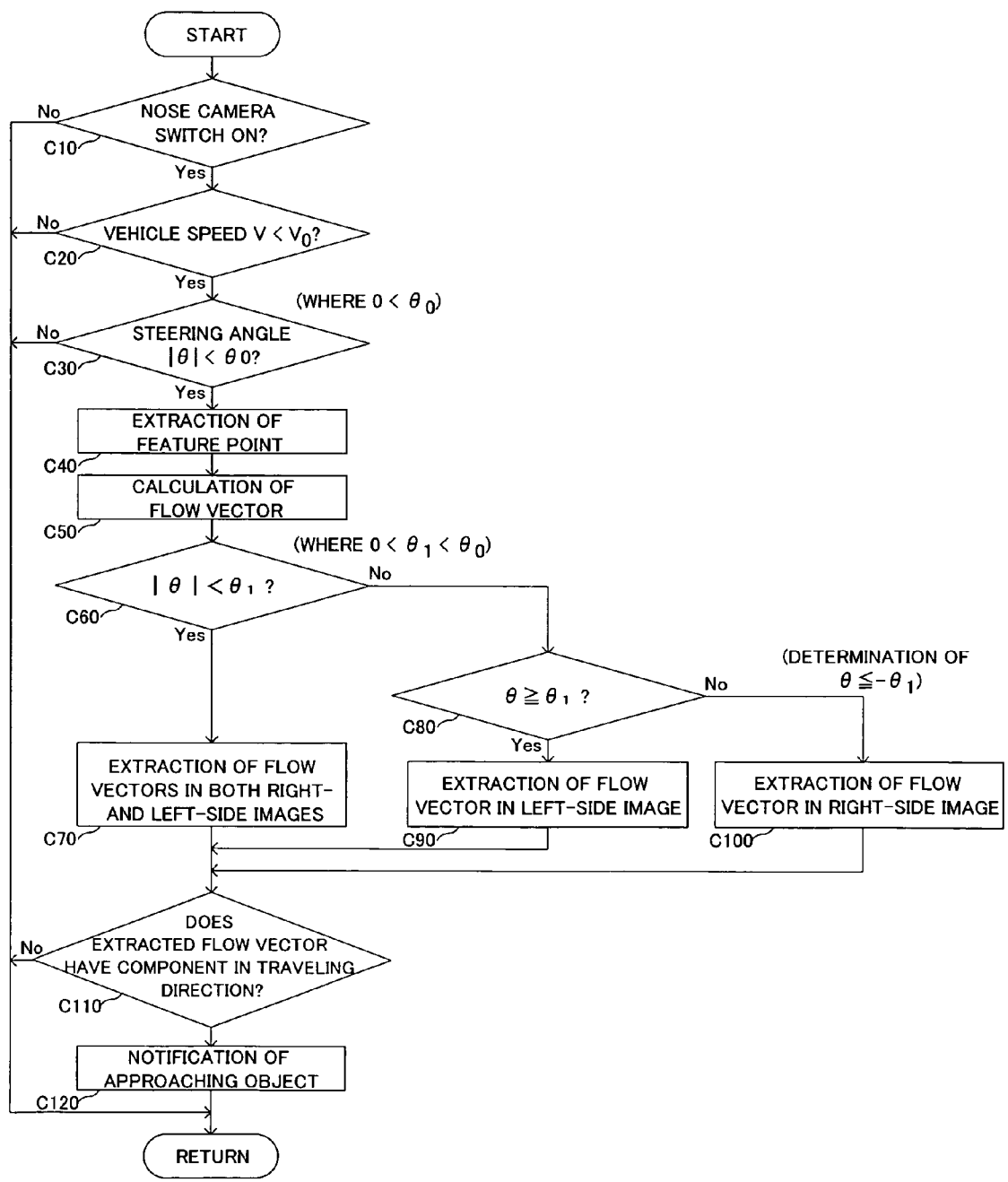
FIG. 9 is a flow chart useful for explaining control in the nose-view monitoring apparatus according to the third embodiment of the present invention.

The nose-view monitoring apparatus 31 according to the third embodiment is thus arranged and executes the following control according to a flow chart shown in FIG. 9.

In the operational flow, steps C10 to C30 are carried out as preliminary steps toward the calculation of an optical flow, and they are for making a decision as to whether or not each of the nose-view cameras 3 is in operation.

First, in the step C10, a decision is made as to whether or not the nose camera switch 6 is put into the on-state. If so, the operational flow advances to the step C20. If it is in the off-state, the operational flow comes to an end. Subsequently, in the step C20, a decision is made as to whether or not the traveling speed V of the vehicle is lower than the predetermined speed $V_0$. If $V<V_0$, the operational flow proceeds to the step C30. On the other hand, if $V \geq V_0$, the operational flow comes to an end. In the step C30, a decision is made as to whether or not the rudder angle $\theta$ of the steered wheel is smaller than the predetermined angle $\theta_0$. If $\theta<\theta_0$, the operational flow goes to a step C40. On the other hand, if $\theta \geq \theta_0$, the operational flow comes to an end.

That is, when each of the nose view cameras 3 is in an non-operated condition, the operational flow terminates without advancing to the steps subsequent to the step C40. In other words, the operational flow advances to the steps subsequent to the step C40 only when the nose-view camera 3 is placed into operation.

In the step C40, the optical flow calculating unit 11 individually calculates feature points in the right- and left-side images taken by the nose-view cameras 3 and, in a step C50, calculates flow vectors in terms of all the feature points. That is, in this case, a mobile object is recognized in each of the right- and left-side images.

Following this, in a step C60, a decision is made as to whether or not the rudder angle $\theta$ is smaller than a reference value $\theta_1 (0<\theta_1<\theta_0)$ set at a value smaller than a predetermined value $\theta_0$. That is, in this case, on the basis of the value of the rudder angle $\theta$, a decision is made on a degree of similarity between a flow vector generated by a turn of the vehicle 2 and a flow vector originating from an approaching vehicle.

In the case of $|\theta|<\theta_1$, a decision is made that the steering angle is small, and the operational flow advances to a step C70 where the approaching object detecting unit 52 extracts a flow vector in the right- and left-side images calculated in the optical flow calculating unit 11, then followed by a step C110. Moreover, in the case of other than $|\theta|<\theta_1$, a decision is made that the steering angle is larger to some degree with respect to one of rightward and leftward directions, then followed by a decision step C80.

The step C80 is for making a decision as to whether or not the rudder angle $\theta$ is equal to or larger than the reference angle $\theta_1$. If $\theta \geq \theta_1$, a decision is made that the steering angle is large to some degree in a rightward direction (that is, the vehicle 2 takes a large rightward turning state), and the operational flow proceeds to a step C90 where the approaching object detecting unit 52 extracts only a flow vector(s) in the left-side image from the flow vectors in the images calculated in the optical flow calculating unit 11, then followed by the step C110. On the other hand, in the case of $\theta<\theta_1$, it results in $\theta \leq -\theta_1$ in view of the conditions of the steps C30, C60 and C80 and, hence, a decision is made as a somewhat large steering angle in a leftward direction (that is, the vehicle 2 takes a large leftward turning state), and the operational flow goes to a step C100 where the approaching object detecting unit 52 extracts only a flow vector(s) in the right-side image from the flow vectors in the images calculated in the optical flow calculating unit 11, then followed by the step C110.

In the step C110, a decision is made as to whether or not the flow vector extracted in the steps C70, C90 or C100 has a vector component along a traveling direction of the vehicle 2. With respect to the flow vector in the left-side image relative to the vehicle 2, a decision is made on whether or not it has a rightward vector component in the image while, with respect to the flow vector in the right-side image relative to the vehicle 2, a decision is made on whether or not it has a leftward vector component in the image. That is, in this case, of the mobile objects recognized in the step C50, a mobile object (approaching object) approaching the vehicle 2 is recognized in a state discriminated from others.

If no detection is made of a flow vector having a vector component along the traveling direction of the vehicle 2, there is the absence of an approaching object and, hence, this operational flow comes to an end. On the other hand, in the case of the detection of the aforesaid flow vector, the operational flow advances to a step C120.

In the step C120, the output unit 13 displays the fact of the recognition of the approaching object on the monitor 5 and notifies through sound or voice to the occupant. In this case, for the notification from the output unit 13 to the occupant, the switching among notification modes is made on the basis of the magnitude and number of flow vectors each having a vector component along the traveling direction of the vehicle, detected in the step C110.

Of the flow vectors originating from the approaching object detected in the step C110, there is detected a flow vector whose magnitude is larger than a predetermined magnitude set in advance, or when the number of flow vectors originating from the approaching object exceeds a predetermined number set in advance, the output unit 13 is set in "high-risk notification mode" to emphatically display an area corresponding to the approaching object in the screen, and to display all the flow vectors generated by the approaching object on the screen by using arrows and further notify the fact of a high-risk situation through sound or voice to the occupant.

On the other hand, in a case in which, of the flow vectors of the approaching object detected in the step C110, there is no flow vector having a magnitude larger than the predetermined value set in advance and if the number of detected approaching object flow vectors does not reach the predetermined number set in advance, the output unit 13 is set in the "low-risk notification mode" to display one of the flow vectors generated by the approaching object by using an arrow on the screen, and notifies the fact of the detection of the approaching object through sound or voice to the occupant.

The above-described control provides the following concrete effects.

In a case in which, at a T junction shown in FIG. 5, the vehicle 2 tries to proceed into an arterial road while confirming the lateral safe conditions, when the nose camera switch 6 of the vehicle 2 is manipulated into the on-state, if the vehicle 2 reduces the traveling speed before the arterial road so that it becomes lower than the predetermined speed $V_0$, the nose-view cameras 3 are automatically placed into operation to display the right- and left-side images on the monitor 5. This enables the right- and left-side images to be automatically displayed on the monitor 5 without requiring the occupant to pay attention to the switching of the image on the monitor 5. Moreover, in response to the operation of the nose-view cameras 3, the calculation of an optical flow in the pickup image starts in the ECU 10.

[Stopping Condition]

In a case in which the vehicle 2 is stopping at a position shown in FIG. 5, as shown in FIG. 3A, the positions of the nose-view cameras 3 are fixed and, hence, no flow vector appears in the background portion (background portion of the vehicles 41 and 42 in the image; in this case, roads, buildings, guard rails and sky which do not move) in the pickup images, while only the flow vectors (indicated by black arrows in FIG. 3A) generated by the vehicles 41 and 42 which are objects approaching the vehicle 2 develop. At this time, with respect to the directions of the flow vectors originating from the vehicles 41 and 42, the vehicle 41 provides a rightward vector component in the left-side image, that is, it shows a vector component along the traveling direction of the vehicle 2 in the image. On the other hand, the vehicle 42 provides a leftward vector component in the right-side image and shows a vector component along the traveling direction of the vehicle 2 in the image.

Therefore, the approaching object detecting unit 12 can detect the vehicles 41 and 42, which are approaching objects, on the basis of the flow vectors each having a vector component along the traveling direction of the vehicle 2 in the right- and left-side images.

[Advancing Condition]

In addition, in a case in which the vehicle 2 is advancing at a low speed (traveling speed $V<V_0$) at the position shown in FIG. 5, that is, when the occupant is advancing the vehicle 2 slowly while confirming the lateral safe conditions, as shown in FIG. 3B, flow vectors (indicated by outline arrows in FIG. 3B) appear also in background portions in the pickup images due to the movements of the pickup positions of the nose-view cameras 3. Moreover, the flow vectors generated by the vehicle 41 and 42 develop as flow vectors (indicated by black arrows in FIG. 3B) which are the sum of the flow vectors (i.e., the flow vectors indicated by the black arrows in FIG. 3B) which will appear when the vehicle 2 is in a stopping condition and the flow vectors (i.e., the flow vectors indicated by the outline arrows) of the background portions which appear due to the movements of the positions of the nose-view cameras 3. The flow vectors of the background portions develop as flow vectors having a vector component in a direction opposite to the traveling direction of the vehicle 2 in the image when the vehicle 2 advances.

Accordingly, although the magnitude and direction of the flow vectors originating from the vehicles 41 and 42 vary (deform) when the vehicle 2 advances slowly, if the vehicle 2 is slowly moving at a low speed, a great variation does not occur and, hence, a vector component appears along the traveling direction of the vehicle 2 in the image. Moreover, even if, of the flow vectors originating from the vehicles 41 and 42, the vector component with respect to the vehicle traveling direction becomes equivalent to the flow vector of the background portion, since the flow vectors originating from the vehicles 41 and 42 also include vectors in enlarging directions in the image, i.e., in vertical directions in the image, due to the approach to the vehicle 2, the counteraction on the flow vectors originating from the vehicles 41 and 42 does not occur.

At this time, as shown in FIG. 3C, the directions of the flow vectors due to the vehicles 41 and 42 are vector directions in which a vector component exists along the traveling direction of the vehicle 2, that is, a direction of a rightward vector component in the left-side region and a direction of a leftward vector component in the right-side region. In other words, in the left-side region, it is a flow vector having a direction in a clockwise range of 180 degrees with respect to a vertical direction, and in the right-side region, it is a flow vector having a direction in a counterclockwise range of 180 degrees with respect to a vertical direction.

Furthermore, the approaching object detecting unit 12 can detect the vehicles 41 and 42 as approaching objects on the basis of the flow vectors each having a vector component along the vehicle traveling direction in the right- and left-side images. Therefore, the output unit 13 of the ECU 10 outputs the fact of the detection of the approaching objects to the monitor 5 to alert the occupant.

Still furthermore, the output unit 13 makes the switching of the notification mode in accordance with a degree of risk of the approaching object to the own vehicle 2, which enables the effective notification of the degree of risk to the occupant and enhances the safety.

Incidentally, in a case in which the vehicle 2 advances quickly, because of an increase in the flow vector corresponding to the background portion which develops due to the movement of the position of the nose-view cameras 3, it is considered that, with respect to the directions of the flow vectors originating from the vehicles 41 and 42, a vector component along the traveling direction of the vehicle 2 disappears in the image. However, in this embodiment, since the operations of the nose-view cameras 3 are suspended when the traveling speed V of the vehicle 2 is equal to or higher than the predetermined speed $V_0$, the mistaken recognition on an approaching object is preventable. Likewise, since the operations of the nose-view cameras 3 come to a stop when the steering angle θ of the vehicle 2 is equal to or larger than the predetermined angle $θ_0$, the mistaken recognition on an approaching object due to the turning movement is avoidable. In consequence, this can enhance the accuracy of detection of an approaching object based on the optical flow.

In addition, even in the case of the suspension of the operations of the view-nose cameras 3, the output unit 13 notifies this fact to the occupant, which can alert the occupant and enhance the safety.

Although the values of the predetermined speed $V_0$ and the predetermined angle $θ_0$ can arbitrarily be set according to the mode of implementation, when the vehicle 2 moves, as the traveling speed V and steering angle θ thereof increase, the aforesaid flow vector of the background portion becomes larger. Accordingly, for the detection of an object approaching at a high speed, no problem arises even if the predetermined speed $V_0$ and the predetermined angle $θ_0$ are set at high values. On the other hand, for the detection of an object approaching at a low speed, it is desirable that the vehicle 2 is in a stopping condition. However, in a case in which the vehicle 2 is on the movement, by using a difference in directivity between the flow vectors originating from the vehicles 41 and 42 which are approaching object traveling on a general public way and the flow vectors developing in conjunction with the background portion (that is, by the above-mentioned logic), the vehicles 41 and 42 which are approaching objects can be recognized in a state discriminated from the background portion.

[Turning Condition]

Moreover, in a case in which the vehicle 2 is turning rightwards from the position shown in FIG. 5 at a low speed (traveling speed $V<V_0$), that is, when the occupant steers the vehicle 2 in a rightward direction intended while confirming the lateral safe condition and advancing the vehicle 2 slowly, as shown in FIG. 3D, flow vectors (indicated by outline arrows in FIG. 3D) develop even in a background portion of a pickup image due to the movements of the image pickup positions of the nose-view cameras 3. Moreover, the flow vectors (indicated by the black arrows in FIG. 3D) originating from the vehicles 41 and 42 develop as the sum of the flow vectors (i.e., the flow vectors indicated by the black arrows in FIG. 3A) which will develop when the vehicle 2 is in a stopping condition and the flow vectors (the flow vectors indicated by the outline arrows therein) generated by the background portion due to the positional movements of the nose-view cameras 3. Still moreover, the flow vectors on the background portion appear as flow vectors each having a vector component in a leftward direction relative to the vehicle in the image.

In this case, the approaching object detecting unit 52 selects a flow vector(s) to be referred to, on the basis of the value of the rudder angle of the vehicle 2. That is, in the case of a rightward turn at the rudder angle $\theta \geqq \theta_1$, flow vectors are extracted from the left-side area to detect an approaching object therefrom. In this case, of the flow vectors shown in FIG. 3D, a flow vector having a rightward vector component is extracted from the left-side area of the image, and a decision is made that the extracted flow vector is a flow vector generated by an object approaching the vehicle) (i.e., of the mobile objects having the flow vectors, an object approaching the own vehicle 2), thus recognizing the approaching object. Therefore, the approaching vehicle 41 is precisely detectable.

Moreover, no reference is made to flow vectors in the image in the right-side area. Therefore, the flow vectors (indicated by white arrows in the right-side image of FIG. 3B) originating from the turning of the vehicle 2 is preventable from being mistaken for the flow vectors (indicated by black arrows in the right-side image of FIG. 3B) generated by the approaching vehicle and the arithmetic operation needed for the detection of the approaching vehicle is reducible to half.

Moreover, this also applies to a case of a leftward turn at the rudder angle $\theta \leqq -\theta_1$, and the approaching object detecting unit 52 extracts flow vectors from the left-side area and detects an approaching object therefrom. In this case, the flow vectors each having a leftward vector component are extracted in the right-side area image, and a decision is made that the extracted vectors are flow vectors generated by the approaching object approaching the vehicle 2, thus recognizing the approaching object. Therefore, the accurate detection of the approaching vehicle 41 becomes feasible. Still moreover, since no reference is made to the flow vectors in the left-side area image, the mistaken recognition is preventable and the arithmetic throughput is reducible to half.

As described above, with the nose-view monitoring apparatus according to the third embodiment of the present invention, the mistaken recognition is reducible by making reference to only the optical flow vectors existing in a direction which enables the reliable detection of an object approaching the own vehicle and the rate of detection of an approaching object is improvable. Moreover, even if the vehicle 2 is in a stopping condition, and even in the case of a low-speed ($V<V_0$) run, or even in a state where the steering angle is smaller than a predetermined angle ($\theta<\theta_0$), an approaching object in lateral regions relative to a vehicle is easily and reliably recognizable and the movement of a background image can be prevented from being mistaken for an approaching object, thereby improving the accuracy of detection on an approaching object. Moreover, of mobile objects to be recognized on the basis of an optical flow, an approaching object which is dangerous to the own vehicle 2 is recognizable with a simple arrangement, and the arithmetic throughput of the ECU 10 needed for the recognition of an approaching object is reducible. Still moreover, the notification to be made according to a degree of risk can improve the safety.

Although the description has been given above of the first to third embodiments of the present invention, it should be understood that the present invention is not limited to the above-described embodiments, and that it is intended to cover all changes and modifications of the embodiments of the invention herein which do not constitute departures from the spirit and scope of the invention.

For example, although in the above-described embodiments the nose-view cameras 3 serving as image pickup means are respectively provided at right- and left-hand end portions of a nose section of the vehicle 2, it is also acceptable that the nose-view camera 3 is provided at only one of them, or that the right- and left-side regions relative of the vehicle are simultaneously picked up by using a wide-angle camera having a wide image pickup area.

In addition, it is also appropriate that the image pickup area of the nose-view camera 3 is adjusted horizontally in accordance with an angle made between a traveling direction of the vehicle 2 and a direction of an arterial road into which the vehicle 2 tries to proceed, or that the image pickup area of the nose-view camera 3 is adjusted vertically in accordance with an inclination of a traveling road.

Still additionally, in the above-described embodiments, the predetermined speed $V_0$ and the predetermined angle $\theta_0$ are arbitrarily set in accordance with the magnitude of a flow vector of a mobile object to be recognized. Meanwhile, for example, with respect to a mobile object moving while having a flow vector larger in magnitude than a flow vector of a background portion which develops due to the positional movement of the vehicle 2 (nose-view camera 3) even if the traveling speed V of the vehicle 2 is higher than the predetermined speed $V_0$, the recognition thereof is feasible with the above-mentioned arrangement.

Moreover, in the above-described embodiments, the notification method of the output unit 13 can arbitrarily be determined and, for example, when an approaching object in an image on the monitor 5 is displayed emphatically, it is also possible that an approaching object is displayed in a state enlarged in an image, or it is also appropriate that the notification to the occupant is made by putting a braking device of the vehicle 2 into operation.

Still moreover, it is also appropriate that a plurality of notification modes each corresponding to a degree of risk are set in a multistage fashion. For example, the number of notification modes to be switched on the basis of the magnitude and number of flow vectors originating from an approaching object detected by the approaching object detecting unit 12 is further increased so that the degrees of possibility on the risk of the approaching object to the own vehicle are set in a multistage fashion, which carries out finer notification, thus enhancing the safety and improving the reliability of an apparatus itself related to the decision on risk.

What is claimed is:

1. A nose-view monitoring apparatus characterised by comprising:
    image pickup means provided on a nose of a vehicle for picking up a side-view image with respect to said vehicle;
    optical flow vector calculating means for calculating an optical flow vector on the basis of said image;
    approaching object detecting means for detecting an approaching object on the basis of an optical flow vector having a vector component along a traveling direction of said vehicle in said image which vector is included in the optical flow vectors calculated by said optical flow vector calculating means and;
    notification means for displaying said image and further for notifying the fact of the detection of said approaching object.

2. The nose-view monitoring apparatus according to claim 1, characterised in that said image pickup means is made to pick up side-view images of right-side region and left-side region with respect to said vehicle,
    said optical flow vector calculating means is made to calculate an optical flow vector on the basis of each of said side-view images of said right-side region and left-side region with respect to said vehicle, picked up by said image pickup means, and
    said approaching object detecting means is made to detect said approaching object on the basis of an optical flow vector having a rightward vector component which vector is included in the optical vectors in said left-side region calculated by said optical flow vector calculating means, and on the basis of an optical flow vector having a leftward vector component which vector is included in the optical flow vectors in said right-side region calculated by said optical flow calculating means.

3. The nose-view monitoring apparatus according to claim 1, characterised by further comprising vehicle speed detecting means for detecting a speed of said vehicle,
    wherein said approaching object detecting means suspends the detection of said approaching object when said vehicle speed exceeds a predetermined value set in advance.

4. The nose-view monitoring apparatus according to claim 3, characterised in that said notification means notifies the fact of the suspension of the detection of said approaching object in said approaching object detecting means.

5. The nose-view monitoring apparatus according to claim 1, characterised by further comprising steering angle detecting means for detecting a steering angle of said vehicle,
    wherein said approaching object detecting means suspends the detection of said approaching object when said steering angle exceeds a predetermined value set in advance.

6. The nose-view monitoring apparatus according to claim 5, characterised in that said notification means notifies the fact of the suspension of the detection of said approaching object in said approaching object detecting means.

7. The nose-view monitoring apparatus according to claim 1, characterised by further comprising:
    turning direction detecting means for detecting a turning direction of said vehicle;
    turning state corresponding value detecting means for detecting a parameter corresponding to a turning state of said vehicle; and
    turning optical flow vector setting means for setting a turning optical flow vector generated by a turn of said vehicle in said side-view image with respect to said vehicle, on the basis of said turning direction and said parameter,
    said optical flow vector calculating means including optical flow vector correcting means for subtracting said turning optical flow vector, set in said turning optical flow vector setting means, from an optical flow vector calculated on the basis of said image to carry out correction, and
    said approaching object detecting means being made to detect an approaching object on the basis of an optical flow vector having a vector component along a traveling direction of said vehicle in said image which vector is included in the optical flow vectors corrected by said optical flow vector correcting means in said optical flow vector calculating means.

8. The nose-view monitoring apparatus according to claim 7, characterised in that said turning state corresponding value detecting means detects an angular velocity at a turn of said vehicle as said parameter corresponding to the turning state of said vehicle.

9. The nose-view monitoring apparatus according to claim 7, characterised in that said turning state corresponding value detecting means detects a traveling speed of said vehicle and a steering angle thereof as said parameter corresponding to the turning state of said vehicle.

10. The nose-view monitoring apparatus according to claim 7, characterised in that said turning optical flow vector setting means sets a direction of a turning optical flow vector at a horizontal direction and an outward direction relative to said turning direction detected by said turning direction detecting means, and sets the magnitude of said turning optical flow vector to correspond to a value of said parameter detected by said turning state corresponding value detecting means.

11. The nose-view monitoring apparatus according to claim 10, characterised in that said turning state corresponding value detecting means detects an angular velocity at a turn of said vehicle as said parameter corresponding to the turning state of said vehicle.

12. The nose-view monitoring apparatus according to claim 10, characterised in that said turning state corresponding value detecting means detects a traveling speed of said vehicle and a steering angle thereof as said parameter corresponding to the turning state of said vehicle.

13. The nose-view monitoring apparatus according to claim 1, characterised by further comprising turning direction detecting means for detecting a turning direction of said vehicle,
    wherein said approaching object detecting means detects an approaching object on the basis of an optical flow vector existing in a lateral region along a turning outward direction of said vehicle detected by said turning direction detecting means and having a vector component along a traveling direction of said vehicle in said image which vector is included in the optical flow vectors calculated by said optical flow vector calculating means at a turn of said vehicle, and said approaching object detecting means does not make reference to an optical flow vector existing in a lateral region along a turning inward direction of said vehicle detected by said turning direction detecting means for the detection of said approaching object.

14. The nose-view monitoring apparatus according to claim 1, characterised in that said notification means makes the switching among a plurality of notification modes in accordance with the magnitude or number of optical flow vectors each having a vector component along a traveling direction of said vehicle and notifies the fact of the detection of said approaching object while displaying said image which vector is calculated in said optical flow vector calculating means.

* * * * *